US012743287B1

(12) United States Patent
Tayari et al.

(10) Patent No.: US 12,743,287 B1
(45) Date of Patent: Sep. 22, 2026

(54) SYSTEM AND METHOD FOR DYNAMIC OVERLAY CONFIGURATION OF SCOPE-CONSTANT ELEMENTS

(71) Applicant: Next Silicon Ltd, Givatayim (IL)

(72) Inventors: Ilan Tayari, Tzur Hadassa (IL); Ronen Gal, Ramat Gan (IL); Elad Raz, Ramat Gan (IL); Or Biri, Tel Aviv (IL); Arkadi Sharshevsky, Ramat Gan (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/543,974

(22) Filed: Feb. 19, 2026

(51) Int. Cl.
*G06F 9/445* (2018.01)

(52) U.S. Cl.
CPC ................................ *G06F 9/44505* (2013.01)

(58) Field of Classification Search
CPC .................................................. G06F 9/44505
See application file for complete search history.

(56) References Cited

U.S. PATENT DOCUMENTS 6,732,354 B2 * 5/2004 Ebeling ..................... G06F 8/31 717/149
2009/0271598 A1 * 10/2009 Bayus ....................... G06F 8/65 713/1
2012/0054727 A1 * 3/2012 Joukov ............... G06F 9/44505 717/168
2019/0065177 A1 * 2/2019 Khoongumjorn ......... G06F 8/71
2020/0183717 A1 * 6/2020 Deutsch .................. G06F 30/20

OTHER PUBLICATIONS

Wikibooks "360 Assembly / 360 Instructions / EX", Wikibooks, Open Books for An Open World, 4 P., Last Edited Jun. 8, 2024.

* cited by examiner

*Primary Examiner* — Zahid Choudhury

(57) ABSTRACT

A system for executing a software program, comprising: a reconfigurable processing grid; and a processor configured to: identify in operations of a program scope-constant elements that remain constant during execution within an identified scope of the program; apply a main configuration to the grid, wherein the main configuration implements modified operations, in which for each of the scope-constant elements each reference thereto is replaced by a placeholder element implemented by a constant element, each constant element corresponding to one of the scope-constant elements and not updatable by execution of the identified scope; determine runtime elements, one for each of the scope-constant elements; and prior to execution of the scope by the grid, apply to the grid an overlay configuration that modifies the constant elements without replacing the main configuration, updating each constant element to hold the respective runtime element determined for the scope-constant element that the constant element corresponds to.

21 Claims, 15 Drawing Sheets

300A

SYSTEM AND METHOD FOR DYNAMIC OVERLAY CONFIGURATION OF SCOPE-CONSTANT ELEMENTS

BACKGROUND

Some embodiments described in the present disclosure relate to a computerized system and, more specifically, but not exclusively, to a computerized system comprising a reconfigurable processing grid.

As used herein, unless otherwise noted the term 'reconfigurable processing grid' refers to a processing architecture comprising a plurality of reconfigurable logical elements connected by a plurality of reconfigurable data routing junctions that can be configured to implement various computational operations and data flow patterns. For brevity, henceforth the term 'reconfigurable grid' is used to mean 'reconfigurable processing grid' and the terms are used interchangeably.

As used herein, unless otherwise noted the term 'program' is used to mean 'software program' and the terms are used interchangeably.

As used herein, unless otherwise noted the term 'constant element' refers to an element in an implementation of a software program that cannot be modified by executing an identified scope of the software program. A constant element may provide a fixed value during execution of the identified scope of the program. A constant element may provide a fixed operation during execution of the identified scope of the program. A constant element may be implemented in a reconfigurable processing grid as a configured logical element that outputs a constant value or implements a fixed operation. In instruction-based execution, a constant element may be implemented as an immediate value encoded in an instruction. Not only does the value provided by a constant element not change during execution of the identified scope of the program, the constant element itself is not, and in some cases cannot, be modified by executing the scope of the program, i.e. executing the scope of the program does not assign a new value to the constant element and in some cases executing the scope of the program cannot assign a new value to the constant element.

As used herein, unless otherwise noted the term 'variable element' refers to an element in an implementation of a software program that can be updated with different values during execution of the software program, by instructions of the software program. A variable element requires mechanisms for storing, retrieving, or propagating values during execution, or any combination thereof.

When implementing a software program element, there is a fundamental distinction between using a constant element and using a variable element. Implementing program elements as constant elements rather than variable elements provides significant efficiency advantages. Constant elements consume fewer processing cycles because they do not require value propagation through dataflow graphs or memory retrieval operations. Constant elements require less implementation area because they use simpler logical circuits without routing mechanisms and less storage. Constant elements consume less power by eliminating memory accesses and variable management operations. In reconfigurable processing grids, a constant element implemented as a simple configured output requires minimal grid resources compared to a variable element that requires storage elements and data routing. In addition, a constant element may be implemented without circuitry for handling addresses. In instruction-based execution, an immediate value encoded in an instruction requires no memory access, and possibly fewer register allocations, compared to a variable loaded from memory. In addition, an immediate value does not require storage in a data memory cache whereas a variable loaded from memory may require storage in a data memory cache. In addition, accessing an immediate value may have lower latency that accessing a variable as an immediate value may be accessed via an instruction pipeline, through fetch and decode operations, whereas a variable may be accessed via a data pipeline using a cache lookup.

When a program element's value remains constant within an identified scope of execution of a program there are advantages to implementing the program element as a constant element. Some examples of a scope of execution of a program in which a program element's value may remain constant include a function, a dataflow graph, an identified control-flow subgraph, and an identified sequence of computer instructions of the program. A control-flow subgraph may be a loop. A compiler compiling the program, for example to generate executable instructions or a configuration for a reconfigurable grid, may be able to determine that an element could be implemented as a constant element for efficiency, but the actual constant value might not be known at compile time. The constant value may depend on program input data, runtime conditions, profiling data, and/or may vary between different executions of the same scope; for example, different groups of threads may execute the same dataflow graph with different constant values.

For brevity, henceforth the term 'scope-constant element' is used to mean 'program element whose value remains constant within an identified scope of execution of the program'. A scope-constant element is a logical element of the program. Implementing a scope-constant element as a variable element sacrifices efficiency benefits, consuming excessive processing cycles for value operations, excessive area for storage and routing mechanisms, and excessive power.

SUMMARY

It is an object of some embodiments described in the present disclosure to provide a system and a method for executing a software program having one or more scope-constant elements whose values remain constant within an identified scope of execution of the software program.

The present invention addresses the problem of efficiently implementing program elements that remain constant within execution scopes but whose values are not known at compile time (to generate runtime instructions or a configuration), by enabling preparation of implementations using constant elements with placeholder values and rapid overlay-based updating of those placeholder values without replacing the entire implementation.

In some embodiments, during compilation or configuration generation the system identifies scope-constant elements and generates an implementation using constant elements with placeholder values. This base implementation captures the program structure with constant elements but uses temporary placeholder constant values where runtime-determined values will reside. In such embodiments the system also generates overlay information specifying how to locate and update the placeholder values. At runtime, when actual constant values are determined, the system in such embodiments applies an overlay configuration that updates the placeholder values without modifying other parts of the implementation. In embodiments comprising a reconfigurable grid, the overlay configuration may modify the specific constant elements holding placeholder values, leaving the rest of the grid configuration unchanged. In instruction memory embodiments, the system may directly overwrite specific memory locations, for example locations in instruction memory, containing placeholder immediate values, leaving other instructions unchanged.

This selective modification is faster and more power-efficient than replacing complete configurations or reloading instruction sequences. The invention achieves the efficiency benefits of constant elements during execution (reduced processing time, reduced area, reduced power) while enabling flexible runtime value determination, without the overhead of complete reconfiguration or recompilation.

In some embodiments, for example in implementations comprising a reconfigurable processing grid, the overlay configuration approach provides advantages over traditional partial reconfiguration mechanisms. Traditional partial reconfiguration systems operate at relatively coarse granularity, typically reconfiguring entire predefined regions or configuration frames even when only a small number of constant values need to be updated. In contrast, the overlay configuration of the present invention selectively modifies only the specific constant elements that require updating, regardless of their location within the grid, without disturbing any other aspect of the configuration. This finer-grained selective modification may reduce the amount of configuration data that must be transferred and applied, further reducing reconfiguration time and power consumption compared to region-based or frame-based partial reconfiguration approaches.

Optionally, configuration circuitry is configured to update individual constant elements at specific locations throughout the reconfigurable processing grid without reconfiguring entire regions or frames. This may enable the overlay configuration to modify constant elements that may be distributed across different areas of the grid, updating those specific elements while leaving intervening and surrounding grid elements unchanged.

The foregoing and other objects are achieved by the features of the independent claims. Further implementation forms are apparent from the dependent claims, the description and the figures.

According to a first aspect, a system for executing a software program comprises: a reconfigurable processing grid; and at least one hardware processor configured to: for a software program comprising a plurality of operations, identify in the plurality of operations at least one scope-constant element, where a scope-constant element is an element of the software program that remains constant during execution within an identified scope of the software program; apply a main configuration to at least part of the reconfigurable processing grid, wherein the main configuration implements at least one modified operation of the plurality of operations, wherein in the at least one modified operation, for each of the at least one scope-constant element, each reference to said scope-constant element is replaced by a placeholder constant element implemented by a constant element of at least one constant element of the main configuration, each constant element of the at least one constant element corresponding to one of the at least one scope-constant element and not updatable by execution of the identified scope of the software program; determine at least one runtime element, one for each of the at least one scope-constant element; and prior to execution of the identified scope of the software program by the reconfigurable processing grid, apply to the reconfigurable processing grid an overlay configuration that modifies the at least one constant element without replacing the main configuration, wherein the overlay configuration updates each constant element of the at least one constant element to hold the respective runtime element determined for the scope-constant element that the constant element corresponds to, such that the main configuration is modified by the overlay configuration.

According to a second aspect, a method for executing a software program comprises: for a software program comprising a plurality of operations, identifying in the plurality of operations at least one scope-constant element, where a scope-constant element is an element of the software program that remains constant during execution within an identified scope of the software program; applying a main configuration to at least part of a reconfigurable processing grid, wherein the main configuration implements at least one modified operation of the plurality of operations, wherein in the at least one modified operation, for each of the at least one scope-constant element, each reference to said scope-constant element is replaced by a placeholder constant element implemented by a constant element of at least one constant element of the main configuration, each constant element of the at least one constant element corresponding to one of the at least one scope-constant element and not updatable by execution of the identified scope of the software program; determining at least one runtime element, one for each of the at least one scope-constant element; and prior to execution of the identified scope of the software program by the reconfigurable processing grid, applying to the reconfigurable processing grid an overlay configuration that modifies the at least one constant element without replacing the main configuration, wherein the overlay configuration updates each constant element of the at least one constant element to hold the respective runtime element determined for the scope-constant element that the constant element corresponds to, such that the main configuration is modified by the overlay configuration.

According to a third aspect a system for executing a software program comprises: a reconfigurable processing grid; and at least one hardware processor configured to: for at least one thread of the software program, each implementing at least one operation comprising a dataflow graph, identify at least one graph-constant variable, wherein a graph-constant variable is a data variable of the dataflow graph that remains constant throughout execution of the dataflow graph; apply a main configuration to at least part of the reconfigurable processing grid, wherein the main configuration implements at least one modified operation comprising a modified dataflow graph in which, for each of the at least one graph-constant variable, each reference to said graph-constant variable is replaced by a placeholder element of at least one placeholder elements, the placeholder element corresponding to said graph-constant variable; determine at least one runtime value, one for each of the at least one graph-constant variable; and provide the at least one runtime value to the reconfigurable processing grid; and wherein the reconfigurable processing grid is configured to: prior to execution of the at least one thread, update each placeholder element of the at least one placeholder elements to hold the respective runtime value determined for the graph-constant variable that the placeholder element corresponds to.

With reference to the first and second aspects, in a first possible implementation of the first and second aspects the reconfigurable processing grid is configured to execute the identified scope of the software program using the main configuration modified by the overlay configuration. Executing the identified scope of the software program using the main configuration modified by the overlay configuration allows increasing execution speed of executing the identified scope as it uses constant values, eliminating steps of assigning values to variables.

With reference to the first and second aspects, in a second possible implementation of the first and second aspects the reconfigurable processing grid comprises an overlay configuration circuitry. Optionally, the at least one hardware processor is configured to apply the overlay configuration to the reconfigurable processing grid by providing the overlay configuration circuitry with the overlay configuration. Optionally, the overlay configuration circuitry is configured to update each constant element of the at least one constant element according to the overlay configuration. Using overlay configuration circuitry allows applying the overlay configuration concurrently to the at least one hardware processor executing other tasks, increasing performance of the at least one hardware processor.

With reference to the first and second aspects, in a third possible implementation of the first and second aspects the at least one hardware processor is further configured to: prior to determining the at least one runtime element, compute an overlay template configuration for modifying the at least one constant element without replacing the main configuration, wherein the overlay template configuration updates each of the at least one constant element with a temporary element; and after determining the at least one runtime element generate the overlay configuration using the overlay template configuration and the at least one runtime element. Using a template allows preparing the template in advance to executing the software program, and thus facilitates reducing an amount of time during runtime required to update the main configuration, reducing latency in executing the software program. Optionally, the overlay template configuration comprises for each of the at least one constant elements at least one instruction for modifying the constant element in the reconfigurable processing grid to hold the temporary element. Optionally, the overlay template configuration comprises for each of the at least one constant element one or more of: a location in the reconfigurable processing grid, and an association with a scope-constant element of the at least one scope-constant elements. Optionally, the reconfigurable processing grid comprises an overlay configuration circuitry; wherein the at least one hardware processor is configured to apply the overlay configuration to the reconfigurable processing grid by providing the overlay configuration circuitry with the overlay template configuration and the at least one runtime element; and wherein the overlay configuration circuitry is configured to update each constant element of the at least one constant element to hold the respective runtime element determined for the scope-constant element that the constant element corresponds to, using the overlay configuration template and the at least one runtime element.

With reference to the first and second aspects, in a fourth possible implementation of the first and second aspects the at least one scope-constant element is identified using at least one static analysis method applied to at least part of the software program. Using a static analysis method allows identifying the at least one scope-constant element prior to executing the software program, reducing latency during execution thereof.

With reference to the first and second aspects, in a fifth possible implementation of the first and second aspects the at least one hardware processor is further configured to determine the at least one runtime element according to a plurality of statistical values collected while executing the software program. Using a plurality of statistical values collected while executing the software program may increase the accuracy of the at least one runtime element, thus increasing accuracy of an outcome of executing the software program.

With reference to the first and second aspects, in a sixth possible implementation of the first and second aspects the reconfigurable processing grid comprises a plurality of reconfigurable logical elements connected by a plurality of reconfigurable data routing junctions. Optionally, applying the main configuration to the at least part of the reconfigurable processing grid comprises manipulating at least some of the plurality of reconfigurable logical elements and additionally or alternatively manipulating at least some of the plurality of reconfigurable data routing junctions. Using a grid with a plurality of reconfigurable logical elements connected by a plurality of reconfigurable data routing junctions allows updating the at least one constant element by manipulating a subset of the at least some of the plurality of reconfigurable logical elements and additionally or alternatively manipulating a subset of the at least some of the plurality of reconfigurable data routing junctions.

With reference to the first and second aspects, in a seventh possible implementation of the first and second aspects the scope-constant element is a data variable that is part of program data of the software program. Optionally, the data variable is identified in the software program by a variable identifier. Optionally, the scope-constant element is an operation code of a computer instruction of a plurality of computer instructions of the software program.

With reference to the first and second aspects, in an eighth possible implementation of the first and second aspects the overlay configuration updates each of one or more constant elements of the at least one constant element with another constant element and selection circuitry for selecting between one or more runtime values. Updating a constant element with another constant element and selection circuitry allows concurrent execution of multiple threads that use different runtime values, thus allowing an increase in throughput of executing the software program.

With reference to the first and second aspects, in a ninth possible implementation of the first and second aspects the plurality of operations implement a plurality of concurrent threads of the software program. Optionally, each of the concurrent threads implements at least one operation, wherein the at least one operation comprises a common dataflow graph. Optionally, the at least one scope-constant element is at least one graph-constant variable, wherein a graph-constant variable is a data variable of the common dataflow graph that remains constant throughout execution of the dataflow graph and when executing the plurality of concurrent threads will have a common value across all of the plurality of concurrent threads. Optionally, the at least one modified operation comprises a modified dataflow graph in which, for each of the at least one graph-constant variable, each reference to said graph-constant variable is replaced by a placeholder constant value as the respective placeholder constant element, wherein the placeholder constant value is not updatable via execution of the modified dataflow graph. Optionally, the at least one runtime element is at least one runtime value, one for each of the at least one graph-constant variable. Optionally, the at least one hardware processor is further configured to: compute the modified dataflow graph; compute the at least one modified operation, comprising replacing the common dataflow graph in the at least one operation with the modified dataflow graph; and compute the main configuration using the at least one modified operation. Optionally, the at least one hardware processor is further configured to: for another plurality of concurrent threads of the software program, each implementing the at least one operation that comprises the common dataflow graph, determine at least one other runtime value, one for each of the at least one graph-constant variable; and prior to execution of the other plurality of concurrent threads by the reconfigurable processing grid, apply to the reconfigurable processing grid another overlay configuration that modifies the at least one constant element without replacing the main configuration, wherein the other overlay configuration updates each constant element of the at least one constant element to hold the respective other runtime value determined for the graph-constant variable that the constant element corresponds to, such that the main configuration is further modified by the other overlay configuration. Applying another overlay configuration allows changing the runtime values used when executing the scope of the software program, increasing accuracy of executing the program, while reducing latency and complexity required to do so compared to applying a new configuration. Optionally, the at least one hardware processor applies the overlay configuration in response to identifying that the plurality of concurrent threads are ready to execute the modified dataflow graph. Applying the overlay configuration in response to identifying that the plurality of concurrent threads are ready to execute allows deferring determination of the at least one runtime value as late as possible, allowing to increase accuracy of execution of the software program.

With reference to the first and second aspects, in a tenth possible implementation of the first and second aspects the at least one hardware processor is further configured to: for an additional scope of the software program, identify at least one additional scope-constant element that remains constant during execution within the additional identified scope of the software program; apply an additional main configuration to at least another part of the reconfigurable processing grid, wherein the additional main configuration implements at least one additional modified operation of the plurality of operations, wherein in the at least one additional modified operation, for each of the at least one additional scope-constant element, each reference to said additional scope-constant element is replaced by a placeholder constant element implemented by an additional constant element of at least one additional constant element of the additional main configuration, each additional constant element corresponding to one of the at least one additional scope-constant element and not updatable via execution of the additional identified scope of the software program; determine at least one additional runtime element, one for each of the at least one additional scope-constant element; and prior to execution of the additional identified scope of the software program by the reconfigurable processing grid, apply to the reconfigurable processing grid an additional overlay configuration that modifies the at least one additional constant element without replacing the additional main configuration, wherein the additional overlay configuration updates each additional constant element of the at least one additional constant element to hold the respective additional runtime element determined for the additional scope-constant element that the additional constant element corresponds to, such that the additional main configuration is modified by the additional overlay configuration. Using an additional overlay for executing an additional scope of the software program may further reduce an amount of computation resources required to execute the software program.

With reference to the first and second aspects, in an eleventh possible implementation of the first and second aspects the plurality of operations implement a plurality of concurrent threads of the software program. Optionally, the method further comprises executing the plurality of concurrent threads by the reconfigurable processing grid, using the main configuration modified by the overlay configuration.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the accompanying drawings, like reference numerals are used consistently across the figures to denote like elements or components. This consistency is intended to aid in the understanding of the embodiments and should not be construed as limiting the scope of the invention to the specific configurations illustrated.

DETAILED DESCRIPTION

Figure 1:
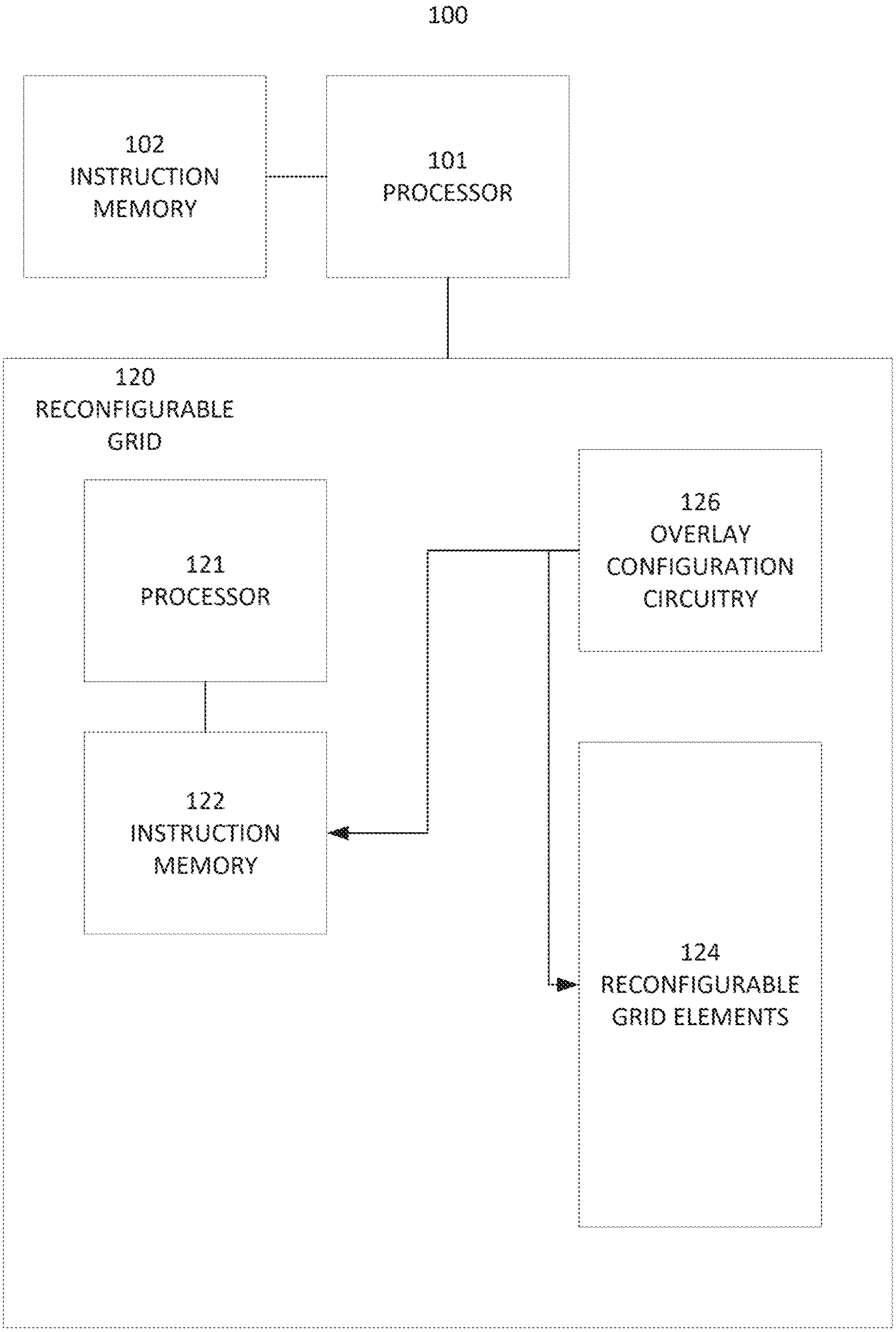
FIG. 1 is a schematic block diagram of an exemplary system, according to some embodiments.

The present invention, in some embodiments thereof, relates to systems and methods for efficiently executing software programs with scope-constant elements, and more particularly, but not exclusively, to overlay configuration that dynamically modifies constant elements without requiring complete reconfiguration of reconfigurable processing grids or recompilation of instruction sequences.

As used herein, the term 'configuration' refers to data and instructions that determine the operational behavior of a reconfigurable processing grid, including the function of individual logical elements and the routing of data between elements. A configuration defines how the reconfigurable grid will process data and execute operations. Configurations may be complete, defining all aspects of the grid's behavior, or partial, defining only certain aspects while leaving others unchanged. Applying a configuration to a reconfigurable processing grid involves loading configuration data and modifying the state of logical elements and routing junctions throughout the grid. The time and power required to apply a configuration may depend, among other considerations, on the amount of configuration data and/or the number of grid elements that must be modified.

As used herein, the term 'instruction memory' refers to a memory area in a computing system where computer instructions of a software program are stored for execution by processing circuitry. Instruction memory may be implemented using various memory technologies including, but not limited to, random access memory (RAM), read-only memory (ROM), cache memory, or other storage devices accessible to processing circuitry. Instructions in instruction memory are fetched and executed by processing circuitry to perform the operations specified by a software program.

As used herein, the term 'immediate value' refers to a constant value that is encoded directly within a computer instruction rather than being stored in a separate memory location or register. An immediate value is part of the instruction itself and is available to the processing circuitry without requiring a separate memory access. Some examples of immediate values include, but are not limited to, numeric constants in arithmetic instructions, address offsets in memory access instructions, and constant operands in logical operations. Using immediate values is more efficient than loading values from memory because it eliminates memory access latency and reduces register pressure, as well as reducing demands for data memory cache capacity and/or access bandwidth.

As used herein, the term 'dataflow graph' refers to a representation of computational operations as a directed graph where nodes represent operations and edges represent data dependencies between operations. In a dataflow graph, an operation executes when all of its input data is available, and the results flow to dependent operations. Dataflow graphs are particularly well-suited for implementation on reconfigurable processing grids because the graph structure can be easily, or sometimes even directly, mapped to the grid's logical elements and routing junctions; additionally or alternatively, dataflow graphs can be compiled into instruction sequences for execution by conventional processing circuitry.

The present invention addresses a fundamental efficiency problem that arises when implementing software programs, whether on reconfigurable processing grids, on instruction-based processors, or on a combination thereof. When a program element's value remains constant within an identified scope of execution, implementing that element as a constant element rather than a variable element provides substantial efficiency benefits. However, when the actual constant value is not known at compile time, traditional compilation approaches cannot generate implementations that fully exploit the efficiency advantages of constant elements.

The efficiency advantages of constant elements may be significant across multiple dimensions. In terms of processing time, constant elements eliminate the cycles required for value propagation through dataflow graphs in reconfigurable grid implementations, and eliminate memory access latency in instruction-based implementations. In terms of implementation area, constant elements use simpler logical circuits without the storage elements and routing mechanisms required by variable elements in reconfigurable grids, and require no memory allocation in program data memory in instruction-based implementations. In terms of power consumption, constant elements eliminate the power consumed by memory accesses, data routing operations, and variable management circuits. In terms of caching resources, constant elements do not require space in a data memory cache, freeing more data memory cache resources for other values in the program's active work set, reducing total latency in memory accesses of the program.

When a compiler identifies that a program element will remain constant within a scope of execution of the program but does not know the actual constant value, traditional approaches force undesirable tradeoffs. A first traditional approach is to implement the element as a variable element despite knowing it will be constant. This approach sacrifices all the efficiency benefits of constant elements. The variable element must include mechanisms for storing, retrieving, or propagating values, or any combination thereof, consuming the extra processing cycles, implementation area, data memory cache space, and power that constant elements would avoid.

A second traditional approach is to generate multiple complete implementations, each with different constant values compiled in. For instruction-based execution, this requires compiling multiple versions of the program or recompiling when constant values change. For reconfigurable grid execution, this requires generating multiple complete configurations. This approach has severe drawbacks. Storing multiple complete implementations consumes substantial memory. In addition, computing multiple complete implementations consumes substantial time and power. More critically, switching between implementations is extremely power-intensive and time-consuming during runtime. In reconfigurable grids, replacing a complete configuration requires modifying potentially millions of logical elements and routing junctions throughout the grid, a process that can consume substantial time and power. In instruction-based execution, reloading instruction sequences into instruction memory disrupts execution flow and consumes time and power for the memory operations and linking new instructions into running processes.

Some reconfigurable processing architectures, for example field-programmable gate arrays (FPGAs), support partial reconfiguration mechanisms that allow portions of the device to be reconfigured while other portions continue operating. However, traditional partial reconfiguration approaches operate at relatively coarse granularity and do not efficiently solve the problem of updating scope-constant elements.

Traditional partial reconfiguration in FPGAs is region-based or frame-based. In region-based partial reconfiguration, specific areas of the FPGA are designated as reconfigurable regions at design time, and different configurations can be loaded into these predefined regions. However, the regions are relatively coarse-grained blocks of logic; the system must reconfigure entire regions even if only a small number of constant values within those regions need to be updated. In frame-based partial reconfiguration, the FPGA configuration memory is organized in frames, typically corresponding to columns or other geometric divisions of the device. Partial reconfiguration writes entire frames of configuration data, even if the actual changes needed affect only a small portion of the logic configured by that frame.

These traditional partial reconfiguration approaches suffer from several limitations when applied to the problem of updating scope-constant elements. First, they operate at a granularity much coarser than individual constant elements. When scope-constant elements are distributed across different areas of a reconfigurable grid, traditional partial reconfiguration would require reconfiguring multiple regions or frames, each of which may contain many other elements that do not need modification. Second, traditional partial reconfiguration requires that reconfigurable regions be defined at design time of the reconfigurable device, limiting flexibility in how constant elements can be distributed throughout an implementation. Third, even when reconfiguring a single region or frame, traditional partial reconfiguration modifies more of the configuration than strictly necessary, consuming more time, power, and configuration bandwidth than would be required to update only the specific constant elements.

The present disclosure, in some embodiments described herein, proposes solving these problems through a dynamic overlay configuration approach that operates at a much finer granularity than traditional partial reconfiguration and does not require predefinition of reconfigurable regions in the reconfigurable device to be done at design time of the reconfigurable device. The present disclosure, in such embodiments, proposes separating the base implementation structure from the runtime value assignment, enabling efficient constant element implementations with flexible runtime value determination.

According to such embodiments, during compilation or configuration generation, the system identifies scope-constant elements within the program that are not modified within an identified scope of executing the program and whose contents may not be known during compilation. Rather than implementing these elements as variable elements or generating multiple complete implementations with different constant values, in such embodiments the system generates a base (main) implementation that uses placeholder constant elements. The placeholder constant elements may have temporary placeholder values. Each placeholder constant element occupies the position where a runtime-determined constant element will ultimately reside, but contains a temporary value rather than the actual constant value needed for execution. To do so, a placeholder constant element may be implemented in the main implementation using a constant element of the main implementation. For example, when the main implementation comprises a main configuration of the reconfigurable grid, a placeholder constant element may be implemented using a constant element comprising some of the plurality of logical elements of the reconfigurable grid and some of the plurality of data routing junctions connecting the plurality of logical elements, configured in the main configuration to hold a temporary value such that the temporary value cannot be modified by executing the identified scope of the program. In another example, when the main implementation comprises a main set of computer instructions, a placeholder constant element may be implemented using a temporary value for an immediate value in a computer instruction. It should be emphasized that according to some embodiments the location of the placeholder constant elements in a configuration or a set of computer instructions is determined during compilation or generation of the configuration and in such embodiments does not require any definition of reconfigurable regions to be done prior to such compilation or configuration generation, for example when designing the reconfigurable device.

In addition, the system may generate overlay information that specifies how to locate and modify the placeholder elements. In embodiments comprising a reconfigurable grid, this overlay information may identify the specific locations within the grid where one or more constant elements with placeholder values reside, optionally along with information about which scope-constant element each constant element corresponds to. In instruction memory embodiments, the overlay information may identify the specific memory addresses and offsets where placeholder immediate values are encoded within instructions, optionally along with metadata associating each placeholder with a scope-constant element.

At runtime, when the actual constant values for scope-constant elements are determined, the system may apply an overlay configuration or modification that updates the placeholder values, without modifying other aspects of the implementation. In embodiments comprising a reconfigurable grid, for example, the overlay configuration may modify the specific one or more constant elements that hold placeholder values, regardless of where those constant elements are located within the grid. In such embodiments, the overlay configuration does not reconfigure entire regions or frames; instead, the overlay configuration selectively updates individual constant elements at specific locations, leaving other grid elements in the base configuration unchanged. This selective modification may update the one or more constant elements distributed across different areas of the grid without disturbing intervening or surrounding elements.

In another example, in embodiments comprising instruction memory, the system may use the overlay information to identify specific memory locations where placeholder immediate values reside, and directly overwrites those memory locations with the actual constant values. This modification may change only the immediate value fields within specific instructions, leaving other instructions and other fields within the modified instructions unchanged.

The advantages of this approach may be substantial. First, the base implementation is generated once and uses efficient constant elements, providing all the performance benefits of constant elements during execution: no value propagation delays, no memory access latency, no data memory cache resources, minimal area and power consumption. Second, updating placeholder values to actual runtime values is dramatically faster and more power-efficient than traditional approaches. Compared to implementing elements as variables, the overlay approach eliminates the ongoing overhead of variable value operations during execution. Compared to complete reconfiguration or recompilation, the overlay approach may modify only the specific one or more constant elements that need updating rather than replacing entire implementations. Compared to traditional partial reconfiguration, the overlay approach operates at much finer granularity, updating individual constant elements rather than entire regions or frames.

In addition, the overlay approach provides flexibility in how constant values are determined. The actual constant values may be determined based on program input data, based on runtime conditions or system state, based on profiling and additionally or alternatively statistical analysis during program execution, and additionally or alternatively based on any other runtime information available to the system. Different executions of the same scope may use different constant values by applying different overlay configurations to the same base implementation, without requiring multiple stored implementations or time-consuming reconfiguration.

The actual runtime values for scope-constant elements may be determined through various mechanisms depending on the nature of the program and the execution environment. In some embodiments, runtime values are determined based on program input data. For example, a program may receive input parameters at startup that determine threshold values, loop bounds, or other constants that will remain fixed throughout subsequent execution scopes.

In some embodiments, runtime values are determined based on profiling and additionally or alternatively statistical analysis of program behavior. The system may monitor program execution to collect statistical information about variable values, branch patterns, other program characteristics, or any combination thereof. Analysis of this statistical information may reveal that certain values remain constant within scopes, or may identify optimal constant values based on observed behavior. The profiling and analysis may be performed during a previous execution of the program, with the resulting constant values used in subsequent executions, or may be performed during an early phase of the current execution, for example an earlier execution of the identified scope in a current execution of the program, with the resulting constant values used in later execution scopes.

In some embodiments, runtime values are determined based on runtime conditions or system state. For example, a number of available processing threads, additionally or alternatively an amount of available memory, and additionally or alternatively other system characteristics, may determine appropriate constant values for certain scope-constant elements. Another example of a condition that may determine a constant value is a memory pointer that is allocated prior to executing the identified scope. Different runtime environments may result in different constant values for the same program.

As used herein, the term 'graph-constant variable' refers to a data variable of a dataflow graph that remains constant throughout execution of the dataflow graph and, when executing a plurality of concurrent threads that each implement the dataflow graph, has a common value across all of the plurality of concurrent threads within a thread group. A graph-constant variable is a specific type of scope-constant element where the identified scope is execution of the dataflow graph. The value of a graph-constant variable does not change during execution of the graph for any thread in the group, and all threads in the group use the same value for that variable. Different groups of concurrent threads may execute the same dataflow graph with different values for the graph-constant variable.

In embodiments involving concurrent threads executing dataflow graphs, runtime values for graph-constant variables may be determined based on thread group assignments or workload characteristics. Different groups of threads may execute the same dataflow graph with different constant values appropriate for their respective workloads or input data.

In some embodiments, the system generates an overlay template configuration before the actual runtime values are known. The overlay template configuration may specify the structure of the overlay, including locations of one or more constant elements to be modified and additionally or alternatively associations between those one or more constant elements and scope-constant elements, but uses temporary placeholder values rather than actual runtime values. When the actual runtime values are subsequently determined, the system may generate a final overlay configuration by combining the overlay template with the runtime values, for example by replacing temporary values in the template with actual runtime values. Using temporary placeholder values allows allocating appropriate resources for an overlay configuration generated based on the template configuration without knowing the actual runtime values.

This template approach may provide additional performance benefits by allowing most of the overlay preparation work to be performed before runtime values are known. Generating the overlay template may involve analyzing the base implementation to identify constant element locations, computing addresses and additionally or alternatively offsets for modification operations, and organizing the overlay data structure. These operations may be performed once when the base implementation is generated. Optionally, these operations are performed during program initialization before runtime values are available. When runtime values are determined, generating the final overlay configuration requires inserting the runtime values into the pre-computed template structure, which is substantially faster than computing the complete overlay from scratch.

In embodiments comprising a reconfigurable grid, the overlay template configuration may comprise, for each constant element to be modified, one or more of: instructions or data for modifying the constant element, the location of the constant element within the grid, or an association indicating which scope-constant element the constant element corresponds to. When runtime values are determined, the system may generate the final overlay configuration by incorporating the runtime values into the template instructions or data.

In embodiments comprising instruction memory, the overlay template may comprise metadata indicating, for each placeholder immediate value, one or more of: the memory address where the placeholder resides, the offset within the instruction where the immediate value field is located, the size and format of the immediate value, a memory address of an instruction that contains the immediate value field, an offset in the instruction memory of an instruction that contains the immediate value field, or an association indicating which scope-constant element the immediate value corresponds to. When runtime values are determined, the system may use this metadata to identify the specific memory locations to modify and may write the runtime values to those locations. The runtime values may be written directly to those locations. Optionally, the runtime values may be written to a configuration manager circuitry that writes directly to those locations.

The overlay configuration approach may be additionally advantageous when multiple different executions of the same scope require different constant values, or when multiple different scopes each have their own scope-constant elements. In such scenarios, the base implementation may be reused across multiple executions or scopes, with different overlay configurations applied for each.

For example, in embodiments involving concurrent threads executing a common dataflow graph, different groups of threads may require different constant values for graph-constant variables. A first group of threads may execute the common dataflow graph with a first set of constant values, while a second group of threads may execute the same common dataflow graph with a second set of constant values. When the system comprises a reconfigurable grid, the system may apply a first overlay configuration to update the one or more constant elements with the first set of values before executing the first group of threads, then may apply a second overlay configuration to update the one or more constant elements with the second set of values before executing the second group of threads. The base configuration of the dataflow graph may remain unchanged; optionally, only the one or more constant element values are modified via the overlay configurations. Optionally, only some of the one or more constant element values are modified via the first overlay configuration and additionally or alternatively the second overlay configuration, for example when a value of a graph-constant element is the same in the first set of values and the second set of values. When the system comprises instruction memory, the system may use first overlay information to overwrite memory locations with the first set of values before executing the first group of threads, then may use second overlay information to overwrite the memory locations with the second set of values before executing the second group of threads.

This approach provides considerable efficiency improvements over traditional approaches. Implementing the graph-constant variables as variable elements would require each thread to receive or load the variable values, consuming cycles and resources for every thread execution. Generating separate complete configurations for each set of constant values would require storing multiple configurations and performing time-consuming complete reconfigurations when switching between thread groups. The overlay approach may allow a single base configuration with rapid, lightweight updates of constant values between thread groups.

In some embodiments, the system handles multiple different scopes within the same program, each with its own scope-constant elements. The system may apply different main configurations to different parts of the reconfigurable processing grid for different scopes, with each main configuration having its own set of one or more constant elements with placeholder values. Each scope then may have its own overlay configuration or template that updates the one or more constant elements specific to that scope. This multi-scope capability allows different portions of a program to be independently configured and updated.

In some embodiments, the reconfigurable processing grid includes overlay configuration circuitry configured to efficiently apply overlay configurations. The overlay configuration circuitry may be implemented as dedicated logic circuits, state machines, or other hardware components within the grid, separate from the reconfigurable logical elements used for computational operations.

The overlay configuration circuitry may receive overlay configuration data from a hardware processor and may apply the specified modifications to the one or more constant elements within the grid. The overlay configuration circuitry may parse the overlay configuration data to extract constant element locations and runtime values, and then may directly modify the identified constant elements without disturbing other grid configuration. Optionally, the overlay configuration data includes one or more instructions that are executed by the overlay configuration circuitry, where the constant element locations and runtime values are encoded in the one or more instructions. By implementing the overlay application in dedicated circuitry within the grid, the system can offload this work from the main hardware processor and can potentially apply overlays more rapidly than software-based configuration updates.

In some embodiments, the overlay configuration circuitry is capable of receiving either a complete overlay configuration with runtime values already incorporated, or an overlay template configuration along with separate runtime values. In the latter case, the overlay configuration circuitry performs the final step of combining the template with the runtime values and applying the resulting modifications. This approach further reduces the work required by a main hardware processor, which may determine the runtime values and provide them to the overlay configuration circuitry along with the pre-computed template.

In addition, the reconfigurable grid may further provide signaling or notification capabilities to coordinate overlay application with program execution. For example, the main configuration may configure the reconfigurable grid to notify the hardware processor when an overlay has been successfully applied and constant elements are ready for execution, and additionally or alternatively indicate when threads or operations are ready to begin execution, and therefore an overlay configuration may be needed.

In some embodiments, rather than applying multiple different overlay configurations sequentially for different thread groups or execution instances, the system may apply a single overlay configuration that incorporates selection circuitry for choosing among multiple runtime values. The overlay configuration may modify constant elements to include both multiple constant values and selection logic that chooses the appropriate value based on runtime conditions such as thread group identification. For example, when multiple groups of threads execute the same dataflow graph with different constant values, the overlay configuration may update each constant element with an enhanced structure comprising storage for multiple constant values and a multiplexer or other selection circuit controlled by a thread group identifier. During execution, each thread may carry a thread group identifier that controls the selection circuitry, causing the constant element to provide the appropriate constant value for that thread's group.

The multiple groups of threads may execute concurrently. The multiple groups of threads may execute temporally separate from each other. This selection-based approach can be advantageous when thread groups are interleaved (executing concurrently) and when rapid switching between groups is required, as it eliminates the need to apply a new overlay configuration when switching between groups, justifying the increased area for the selection circuitry and storage for multiple values within each constant element.

In embodiments where scope-constant elements are implemented in instruction memory rather than in a reconfigurable processing grid, the approach differs in implementation details but may achieve analogous benefits. The compiler or code generator may identify scope-constant elements within the program and may generate instruction sequences in which those elements are implemented as immediate values encoded in instructions. However, instead of encoding the actual constant values (which are not known at compile time), the compiler may generate placeholder immediate values.

The compiler may also generate metadata that maps each placeholder immediate value to its location in instruction memory and additionally or alternatively to the scope-constant element it corresponds to. This metadata may include information such as the memory address of the instruction containing the placeholder, the offset within the instruction where the immediate value field begins, the size and format of the immediate value field, an identifier for the associated scope-constant element, or any combination thereof Δt runtime, when actual constant values are determined, the system may use the metadata to locate the specific bytes in instruction memory where placeholder immediate values reside. The system may then directly overwrite those bytes with the actual constant values, optionally modifying the immediate value fields without changing any other part of the instructions or any other instructions in memory. The compiler or code generator may add to the program's instructions one or more additional instructions that are executed before executing the instruction sequences in which the scope-constant elements are implemented as immediate values and trigger overwriting those bytes in instruction memory with actual constant values. Optionally, another runtime component executed by the system, and not part of the program, receives the actual constant values and overwrites those bytes in instruction memory. In some systems a dedicated processing circuitry may receive the actual constant values and overwrite those bytes in the instruction memory.

This approach provides efficiency benefits analogous to those in embodiments comprising a reconfigurable grid. The instructions may execute with constant immediate values, providing the efficiency of immediate values: no memory access latency, no register allocation for the constants, no storage in a data memory cache, direct availability of values to the processing circuitry. The selective overwriting of immediate value fields is much faster than recompiling the program or reloading a complete new instruction sequence. The base instruction sequence may be reused for different constant values by applying different modifications to the placeholder immediate values.

Some instruction-based architectures provide mechanisms for runtime instruction modification, such as the EX (Execute) instruction in System/360 assembly language, which modifies a target instruction transiently before execution by performing an OR operation on specific instruction bits. However, such transient modification mechanisms differ fundamentally from the overlay configuration approach described herein. The EX instruction modifies instructions in a temporary execution buffer without altering the stored instruction memory, requires modification overhead for every execution, and is limited to modifying specific bit positions within a single instruction. In contrast, the overlay configuration approach may modify the actual stored instruction memory itself. Once applied, the overlay configuration's modifications to constant elements persist in the instruction memory throughout execution of the identified scope without repeated modification operations. In addition, the overlay configuration may modify multiple constant elements simultaneously across a program, and may provide systematic modification of the stored instructions rather than instruction-by-instruction transient modification. The persistent nature of overlay configuration modifications eliminates repeated modification overhead and allows constant elements implemented as immediate values to provide their values directly throughout scope execution. In addition, the overlay approach may be applied to operation codes in an instruction and not only data fields.

Additionally, or alternatively, in some embodiments, rather than having the hardware processor apply an overlay configuration that modifies constant elements after the main configuration is applied, the reconfigurable processing grid itself may be configured to autonomously load runtime values into placeholder elements before beginning execution of the identified scope. In such embodiments, the main configuration may implement placeholder elements that are configured to receive and hold values. The reconfigurable processing grid may autonomously load the provided runtime values into the respective placeholder elements prior to executing the identified scope of the software program. The hardware processor may provide the runtime values to the reconfigurable processing grid through a data interface rather than through a configuration interface. The reconfigurable grid may store the runtime values in a data storage. Additionally, or alternatively, the main configuration may implement circuitry for loading the runtime values into the respective placeholder elements from a context storage storing a runtime context of one or more threads. Dispatcher circuitry, configured to dispatch the one or more threads for execution, may additionally be configured to loading the runtime values into the respective placeholder elements from the data storage in addition to, or as an alternative to, loading the runtime values into the respective placeholder elements from the context storage.

This grid-autonomous loading approach may provide advantages in some execution scenarios. When the reconfigurable processing grid maintains context storage structures for managing execution contexts of multiple threads or thread groups, the grid may load runtime values directly from these context storage structures into placeholder elements as part of context switching or thread initialization operations. This approach integrates the value loading with existing context management mechanisms within the grid, potentially reducing coordination overhead between the hardware processor and the grid. Using this approach, the hardware processor identifies, prior to executing threads, a connection between one or more scope-constant elements and one or more values in contexts of the threads; the grid's internal context management circuitry handles the loading of values into placeholder elements as threads are prepared for execution.

This approach can be understood as statically feeding values to variables before execution begins. Rather than the program's variables dynamically receiving variable values through data propagation during execution, the placeholder elements are pre-loaded with their constant values before any operations of the graph execute. The values are "static" in the sense that they are fixed in the placeholder elements prior to execution of the identified scope and remain constant throughout execution of the identified scope, and they are "fed" to the placeholder elements through the grid's autonomous loading mechanism rather than through operational data paths. Once fed with their runtime values, the placeholder elements function as constant sources within the threads, for example for a dataflow graph, providing their values to dependent operations without requiring value propagation mechanisms during execution.

In addition, when multiple thread groups execute the same dataflow graph with different constant values in rapid succession, the grid-autonomous approach may reduce latency by eliminating the need for the hardware processor to apply a new overlay configuration for each thread group. Instead, the context storage may hold different sets of runtime values for different thread groups, and the grid may load the appropriate values as each thread group is dispatched for execution. The main configuration remains unchanged, and the value loading occurs as an integrated part of the grid's thread dispatch mechanism rather than as a separate overlay configuration step. This approach has the advantage of reducing execution latency as the value loading occurs as an integrated part of the grid's thread dispatch mechanism rather than as value propagation during runtime.

Both this static feeding approach and the overlay approach may achieve the efficiency benefits of constant elements during execution of the identified scope: the placeholder elements, once loaded with runtime values, provide constant values throughout execution without requiring data routing or value propagation mechanisms.

In embodiments supporting grid-autonomous loading, the reconfigurable processing grid may comprise context storage structures configured to store execution contexts for threads or thread groups. The context storage structures may include storage for runtime values corresponding to graph-constant variables of dataflow graphs executed by the threads. When a thread or thread group is prepared for execution, the grid's context management circuitry may retrieve the execution context from the context storage and may load runtime values from the execution context into the placeholder elements corresponding to the graph-constant variables. This loading occurs prior to the thread or thread group beginning execution of the dataflow graph, ensuring that the placeholder elements hold the correct constant values before any operations of the graph are performed.

The data storage structures may be implemented using various storage technologies within the reconfigurable processing grid. Some examples include, but are not limited to, dedicated context memory structures or distributed storage elements associated with thread execution resources. The context management circuitry may comprise dedicated logic circuits, state machines, or other hardware components configured to manage thread contexts and perform value loading operations.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments. In such embodiments, at least one hardware processor 101 is connected to an instruction memory 102.

For brevity, henceforth the term "processing unit" is used to mean "at least one hardware processor". A processing unit may be any kind of programmable or non-programmable circuitry that is configured to carry out a set of operations. A processing unit may comprise hardware as well as software. For example, a processing unit may comprise one or more processors and a transitory or non-transitory memory that carries a program which causes the processing unit to perform the respective operations when the program is executed by the one or more processors. Processing unit 101 may perform computer instructions stored in instruction memory 102.

Optionally, system 100 comprises reconfigurable processing grid 120, connected to processor 101. System 100 may comprise more than one reconfigurable processing grid. Reconfigurable processing grid 120 may comprise a plurality of reconfigurable grid elements 124. Optionally, the plurality of reconfigurable grid elements 124 comprises a plurality of reconfigurable logical elements connected by a plurality of reconfigurable data routing junctions. An example of a reconfigurable logical element is processing circuitry that may be configured to perform one of an identified set of mathematical and logical operations. Some examples of a mathematical operation are addition and subtraction. Some examples of a logical operation are a logical NOT operation and a logical AND operation.

The reconfigurable grid 120 may comprise other processing unit 121, optionally connected to other instruction memory 122. The other instruction memory 122 may be used to store computer instructions executed by processing unit 121.

Optionally, the reconfigurable grid 120 comprises an overlay configuration circuitry 126. Overlay configuration circuitry 126 may be connected to the plurality of reconfigurable grid elements 124 and additionally or alternatively to the instruction memory 122. Optionally, overlay configuration circuitry 126 is used by processing unit 101 to apply an overlay configuration to plurality of reconfigurable grid elements 124 and additionally or alternatively to a set of computer instructions stored in other instruction memory 122.

In some embodiments, system 100 executes a software program, optionally in each of a plurality of iterations. System 100 may execute the program using processing unit 101, processing unit 121, at least some of the plurality of reconfigurable grid elements 124, or any combination thereof.

To execute at least part of the software program, system 100 may implement the following method. For simplicity, the following description describes steps as being executed by processing unit 101, however any of the steps may be executed by other processing unit 121, in addition to, or as an alternative to, being executed by processing unit 101.

Figure 2:
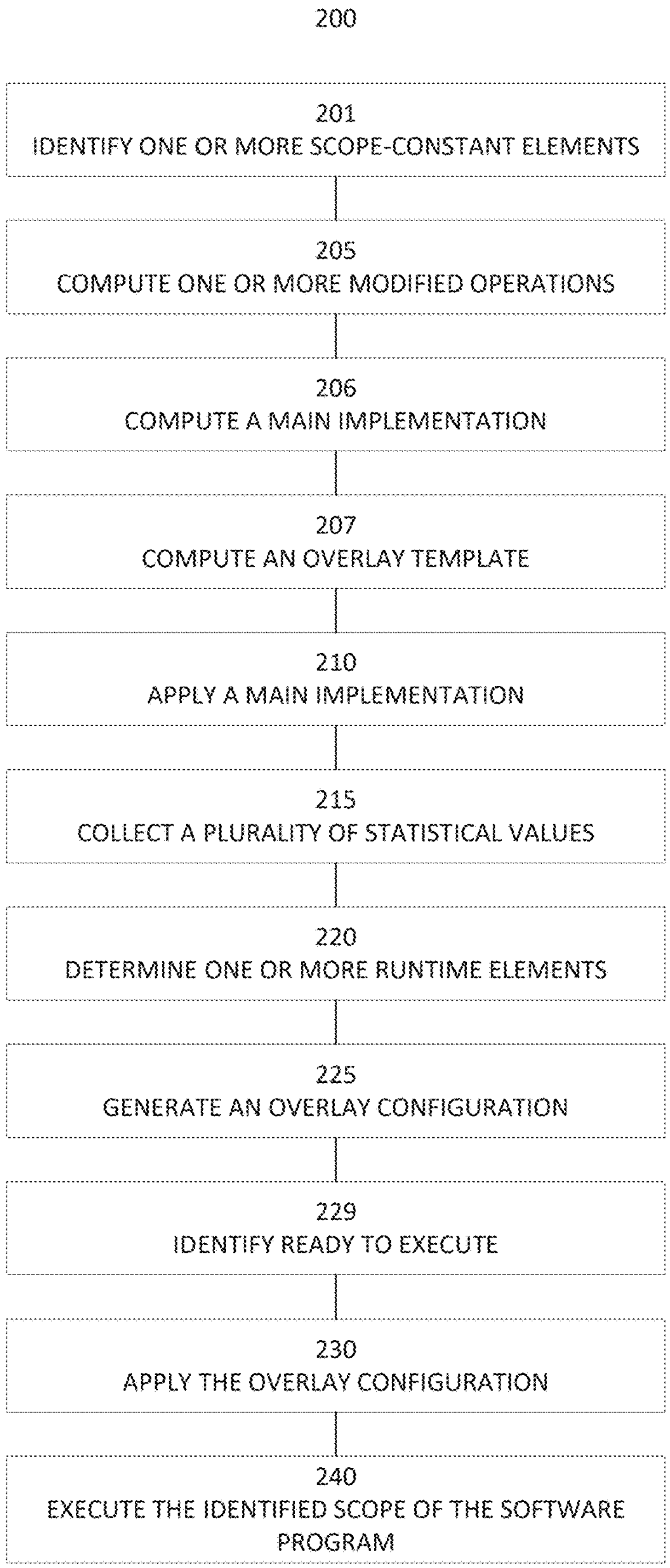
FIG. 2 is a flowchart schematically representing an optional flow of operations, according to some embodiments.

Reference is now made also to FIG. 2, showing a flowchart schematically representing an optional flow of operations 200, according to some embodiments. In such embodiments, the software program may comprise a plurality of operations. Optionally, the plurality of operations implement a plurality of concurrent threads of the software program.

In 201 processing unit 101 may identify one or more scope-constant elements in the plurality of operations of the software program. A scope-constant element may be an element of the software program the remains constant during execution within an identified scope of the software program. A scope-constant element may be a data variable that is part of program data of the software program. A data variable may be identified in the software program by a variable identifier. A data variable is distinguished from an immediate value specified in the software program, that may be part of a computer executable instruction or may be implemented as a constant value using at least some of the plurality or reconfigurable grid elements 124. During execution of the software program, a data variable may be stored in a general purpose register of a processing circuitry or a memory area of the software program.

The software program may have a plurality of computer instructions implementing the plurality of operations. Optionally, the scope-constant element is an operation code of a computer instruction of the plurality of computer instructions. An operation code may be a control flow operation code, some examples including a jump operation code or a conditional branch operation code.

Processing unit 101 may apply one or more static analysis methods to at least part of the software program to identify the one or more scope-constant elements.

Optionally, each of the plurality of concurrent threads implements one or more operations that comprise a common dataflow graph. In such embodiments, a graph-constant element may be a graph-constant variable. A graph-constant variable is a data variable of the common dataflow-graph. The graph-constant variable may remain constant throughout execution of the common dataflow graph. When executing the plurality of concurrent threads, the graph-constant variable may have a common value across all of the plurality of concurrent threads.

Figure 3A:
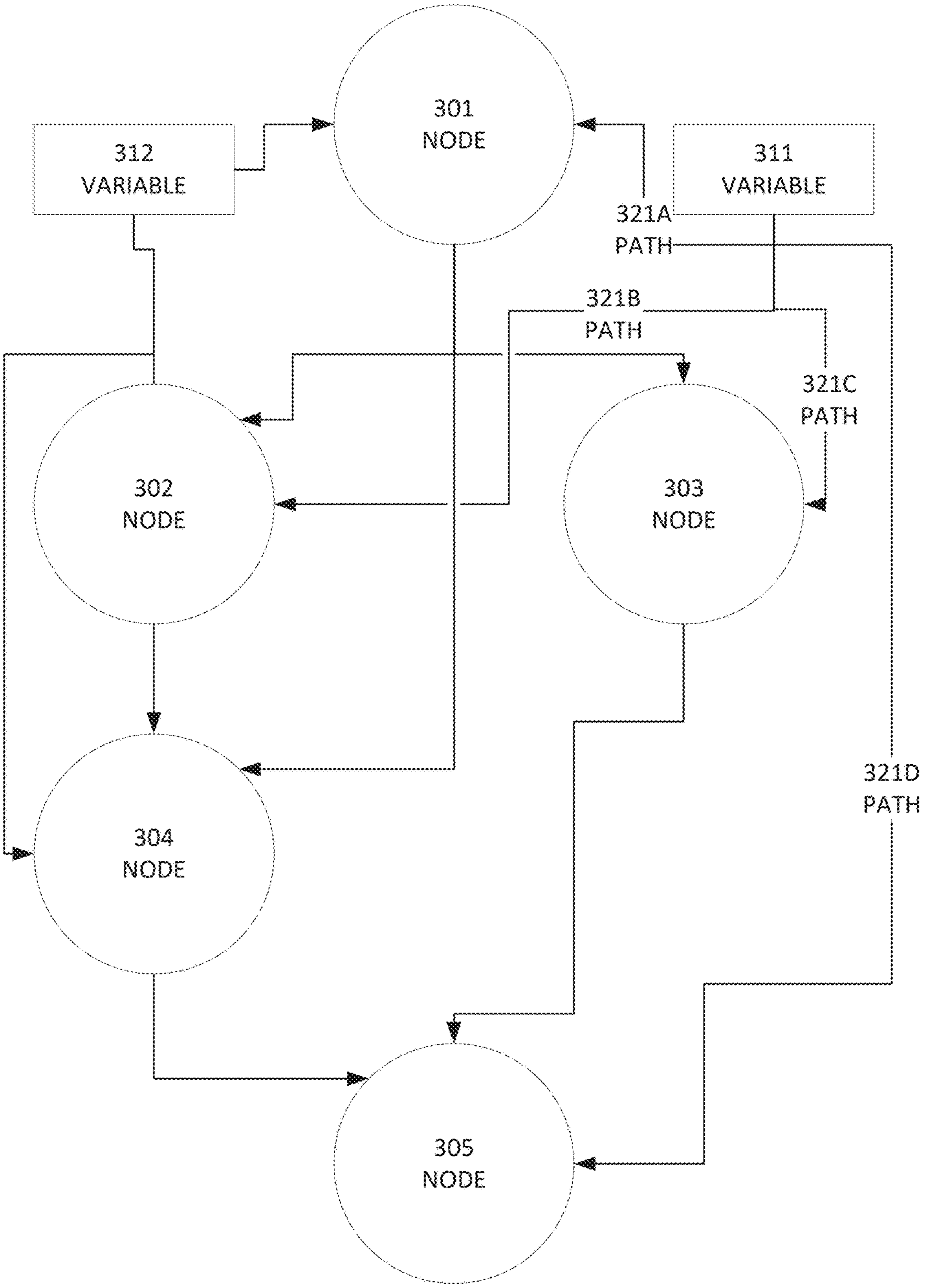
FIG. 3A is a schematic block diagram of an exemplary dataflow graph with thread-constant variables, according to some embodiments.

Reference is now made also to FIG. 3A, showing a schematic block diagram of an exemplary dataflow graph 300A with graph-constant variables, according to some embodiments. In this example, dataflow graph 300A comprises a plurality of nodes, for example including node 301, node 302, node 303, node 304, and node 305. The plurality of nodes may be connected via a plurality of directed edges. Optionally, dataflow graph 300A comprises one or more data variables, for example including variable 311 and variable 312. In this example, variable 311 is an input to node 301 via path 321A, an input to node 302 via path 321B, an input to node 303 via path 321C and an input to node 305 via path 321D. Also in this example, variable 312 is an input to node 301, node 302 and node 304.

Variable 311 may be a graph-constant variable, who value remains constant throughout execution of the common dataflow graph, optionally having a common value across all of the plurality of concurrent threads.

Reference is now made again to FIG. 2. In 205, processing unit 101 optionally computes one or more modified operations. For each of the one or more scope-constant elements, in the one or more modified operations each reference to the scope-constant element is replaced by a placeholder constant element.

For example, when each of the plurality of concurrent threads implements a common dataflow graph, the one or more modified operations may comprise a modified dataflow graph. The common dataflow graph may comprise one or more graph-constant variables. For each of the one or more graph-constant variables of the common dataflow graph, in the modified dataflow graph each reference to the graph-constant variable is replaced by a placeholder constant value.

Figure 3B:
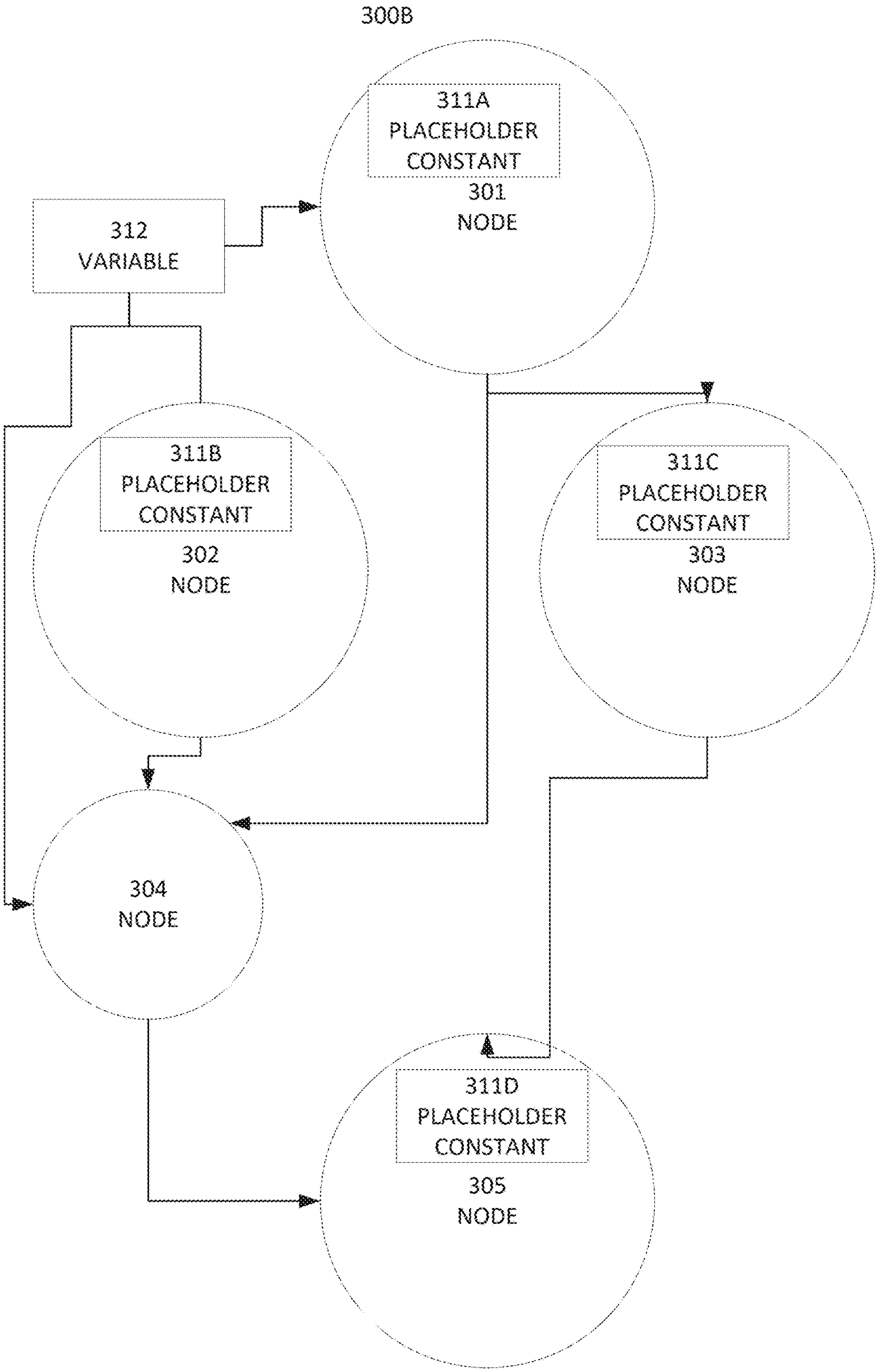
FIG. 3B is a schematic block diagram of an exemplary modified dataflow graph with placeholder constant elements, according to some embodiments.

Reference is now made also to FIG. 3B, showing a schematic block diagram of an exemplary modified dataflow graph 300B with placeholder constant elements, according to some embodiments. In this example, the reference of variable 311 in node 301 via path 321A is replaced with a placeholder constant element 311A in node 301, as the respective placeholder constant element. Similarly, in this example the reference of variable 311 in node 302 via path 321B is replaced with a placeholder constant element 311B in node 302, the reference of variable 311 in node 303 via path 321C is replaced with a placeholder constant element 311C in node 303, and the reference of variable 311 in node 305 via path 321D is replaced with a placeholder constant element 311D in node 305. Optionally, variable 311 is removed from the modified dataflow graph 300B. Further in this example, variable 312 may not remain constant throughout execution of the common dataflow graph, and additionally or alternatively may not have a common value across all of the plurality of concurrent threads, and is not a graph-constant variable. In this example, variable 312 and its connections to 301, node 302 and node 304 remain unchanged compared to dataflow graph 300A.

Reference is now made again to FIG. 2. Optionally, computing the one or more modified operations comprises replacing the common dataflow graph 300A in the one or more operations with the modified dataflow graph 300B.

In 206, processing unit 101 may compute a main implementation. The main implementation may implement the one or more modified operations. Optionally, processing unit 101 computes the main implementation using the one or more modified operations. Optionally, the main implementation comprises one or more constant elements, where a constant element is not updatable by execution of the identified scope of the software program. It should be noted that a constant element may be implemented such that execution of the identified scope of the software program has no means of updating the constant element, for example using an immediate value in a computer instruction or a configuration of a set of logical elements not modifiable by execution of the identified scope. In the main configuration, each placeholder constant element in the one or more modified operations may be implemented using one of the one or more constant elements, where the constant element used to implement the placeholder constant element may correspond the one of the one or more scope-constant elements.

In 210, the processing unit 101 may apply the main implementation. Optionally, the main implementation comprises a main configuration of the reconfigurable grid 120. Optionally, the processing unit 101 applies the main configuration to the reconfigurable grid 120.

Figure 4A:
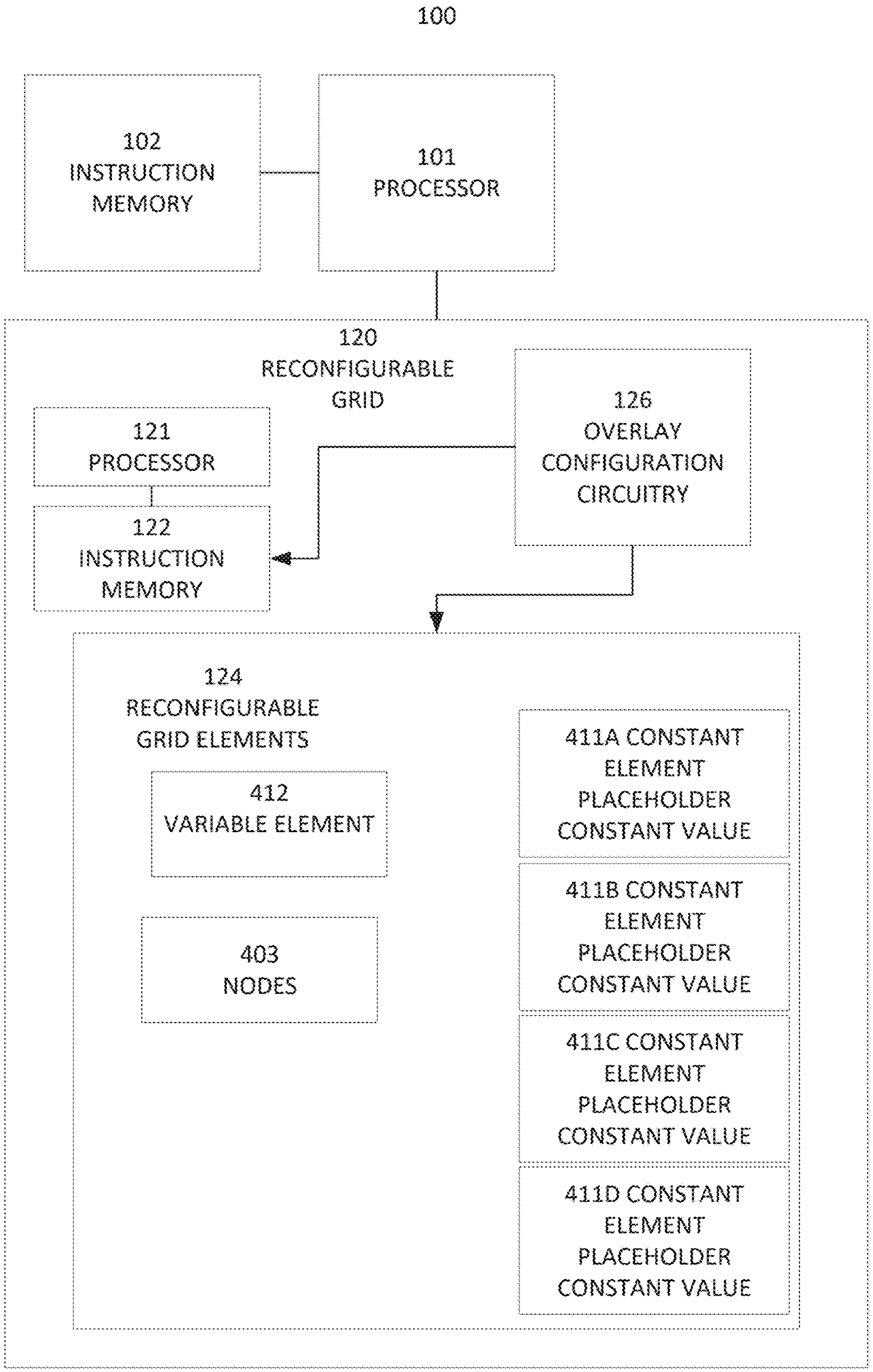
FIG. 4A is a schematic block diagram of the exemplary system after applying a main configuration to the reconfigurable grid, according to some embodiments.

Reference is now made also to FIG. 4A, showing a schematic block diagram of the exemplary system 100 after applying a main configuration to the reconfigurable grid 120, according to some embodiments. In this example, each of the plurality of threads implements the common dataflow graph 300A shown in FIG. 3A, where variable 311 is graph-constant variable within execution of the dataflow graph 300A, such that execution of dataflow graph 300A is an identified scope of execution of the software program where variable 311 is a scope-constant element. Further in this example, the main configuration implements one or more modified operations comprising modified dataflow graph 300B shown in FIG. 3B, such that a scope of executing the modified dataflow graph 300B is the identified scope of execution of the software program.

In this example, processing unit 101 computes a main configuration comprising implementing the modified dataflow graph 300B in the plurality of reconfigurable grid elements 124. Optionally, the main configuration comprises one or more constant elements, including constant element 411A, constant element 4111B, constant element 411C and constant element 411D. In this example, the one or more constant elements are not updatable by execution of the modified dataflow graph 300B. In this example, constant element 411A implements placeholder constant element 311A, constant element 411B implements placeholder constant element 311B, constant element 411C implements placeholder constant element 311C, and constant element 411D implements placeholder constant element 311D.

Further in this example, each of constant element 411A, constant element 411B, constant element 411C and constant element 411D corresponds to scope-constant variable 311 of common dataflow graph 300A. However, in this example none of constant element 411A, constant element 411B, constant element 411C and constant element 411D receive a value from anywhere outside the node in which they are implemented respectively. None of the one or more constant elements receives a value from another node or from a thread's context stored in a context storage while the thread is executing. In the main configuration, one or more of constant element 411A, constant element 411B, constant element 411C and constant element 411D may hold a place holder constant value.

In addition to the one or more constant elements, the main configuration may comprise a variable element 412 implementing variable 312 of modified dataflow graph 300B. Additionally or alternatively, the main configuration may comprise an implementation 403 of one or more nodes of the modified dataflow graph 300B.

Reference is now made again to FIG. 2. In 220, the processing unit 101 may determine one or more runtime elements. The one or more runtime elements may comprise a runtime element for each of the one or more scope constant elements. When the scope-constant element is a variable, a runtime element corresponding to the scope-constant element may be a runtime value. For example, in 220 processing unit 101 may determine a runtime value 1 for scope-constant element 311. When the scope-constant element is an operation code, a runtime element corresponding to the scope-constant element may be an operation code identifier.

Optionally, in 215 the processing unit 101 collects a plurality of statistical values while executing the software program, for example in one or more iterations of the plurality of iterations of executing the software program. One possible example of a statistical value is a data-statistic value, indicative of one or more data values of the plurality of data variables of the software program while executing the software program. Another possible example of a statistical value is a branch-statistic value, indicative of a selected instruction executed in response to executing at least one branch instruction of the software program. Another possible example of a statistical value is a memory access statistical value, for example indicative of one or more memory addresses accessed while executing the software program. When executing method 200 in an identified iteration of the plurality of iterations of executing the software program, the one or more iterations in which the statistical values are collected may precede the identified iteration. Optionally, the one or more iterations in which the statistical values are collected comprise the identified iteration.

The processing unit 101 may determine the one or more runtime elements in 220 according to the plurality of statistical values collected in 215.

In 230, the processing unit 101 may apply an overlay configuration, or modification. The overlay configuration may modify the main implementation. Optionally, the overlay configuration modifies the one or more constant elements of the main implementation without replacing the main implementation. The overlay configuration may update each constant element of the one or more constant elements to hold a respective runtime element. For a constant element of the one or more constant elements, the respective runtime element may be the runtime element determined for the scope-constant element that the constant element corresponds to.

The processing unit 101 may apply the overlay configuration prior to execution of the identified scope of the software program.

When the main implementation is a main configuration applied to the reconfigurable grid 120, the processing unit 101 may apply the overlay configuration to the reconfigurable grid 120. In such embodiments, the processing unit 101 may apply the overlay configuration prior to execution of the identified scope of the software program by the reconfigurable grid 120. Optionally, in 229 the processing unit 101 identifies that the software program is ready to execute the identified scope thereof. For example, the processing unit 101 may identify in 229 that the plurality of concurrent threads are ready to execute the modified dataflow graph.

The reconfigurable grid 120 may signal to the processing unit 101 that the software program is ready to execute the identified scope thereof, for example that the plurality of concurrent threads are ready to execute the modified dataflow graph. Optionally, the processing unit 101 identifies that the software program is ready to execute the identified scope according to the signal received from the processing unit 101.

Figure 4B:
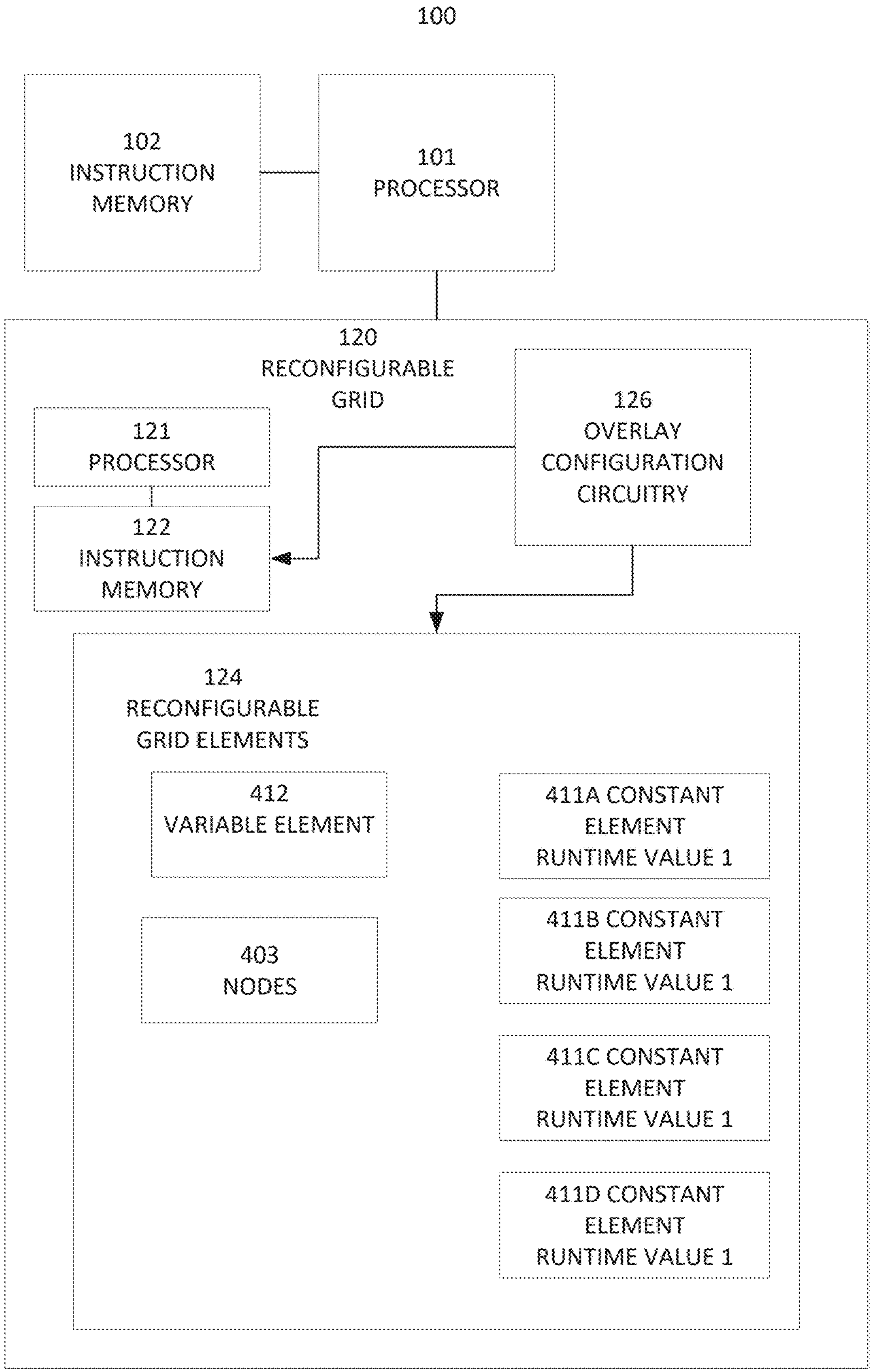
FIG. 4B is a schematic block diagram of the exemplary system after applying an overlay configuration to the reconfigurable grid, according to some embodiments.

Reference is now made also to FIG. 4B, showing a schematic block diagram of the exemplary system 100 after applying an overlay configuration to the reconfigurable grid 120, according to some embodiments. When processing unit 101 determines in 220 runtime value 1 as the runtime element corresponding to variable 311, applying the overlay configuration modifies the main configuration such that each of constant element 411A, constant element 411B, constant element 411C and constant element 411D hold runtime value 1.

The processing unit 101 may apply the overlay configuration to the reconfigurable grid 120 by providing the overlay configuration circuitry 126 with the overlay configuration. Optionally, the overlay configuration circuitry 126 updates each constant element of the one or more constant elements according to the overlay configuration. For example, comprising updating each of constant element 411A, constant element 411B, constant element 411C and constant element 411D to hold runtime value 1.

In some embodiments the main implementation comprises a main set of computer instructions.

Figure 5A:
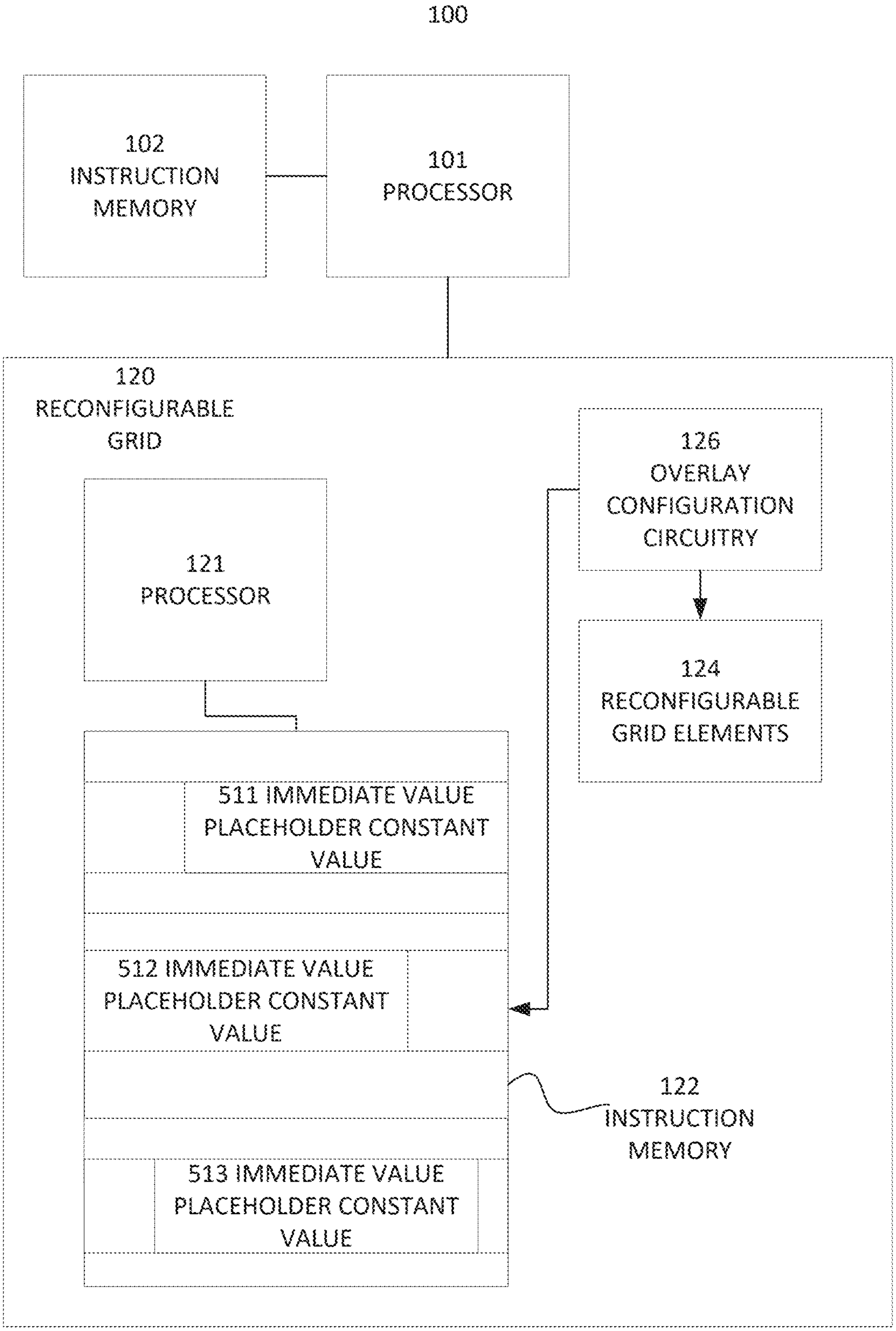
FIG. 5A is a schematic block diagram of the exemplary system after applying a main configuration to the instruction memory, according to some embodiments.

Reference is now made also to FIG. 5A, showing a schematic block diagram of the exemplary system 100 after applying a main configuration to the instruction memory 122, according to some embodiments. In such embodiments, when the one or more operations of the software program are implemented using a plurality of computer instructions, a scope-constant element may be one or more computer instructions of the plurality of computer instructions, or at least part of at least one computer instruction of the plurality of computer instructions.

In such embodiments, applying the main implementation comprises storing computer instructions in an instruction memory of the system, from which one or more processing units executes code.

Computing the main set of computer instructions may comprise generating one or more modified operations by replacing in one or more operations of the plurality of operations one or more references to a scope-constant variable with an immediate value. Optionally, the main set of computer instructions is computed using the one or more modified operations.

In the example, applying the main implementation comprises storing the main set of computer instructions in other instruction memory 122 in the reconfigurable grid 120, connected to other processing unit 121 in the reconfigurable grid 120. For simplicity, the following description focuses on applying the main implementation to other instruction memory 122. However, when the processing unit 101 executes at least part of the software program, any step applied to other instruction memory 122 may be applied, additionally or alternatively, to the instruction memory 102, connected to the processing unit 101.

In this example, the main set of computer instructions comprises one or more immediate values comprising immediate value 511, immediate value 512 and immediate value 513. Optionally, each of the one or more immediate values is associated with a scope-constant variable of the plurality of operations. Optionally, each of immediate value 511, immediate value 512 and immediate value 513 stores a placeholder constant value.

Figure 5B:
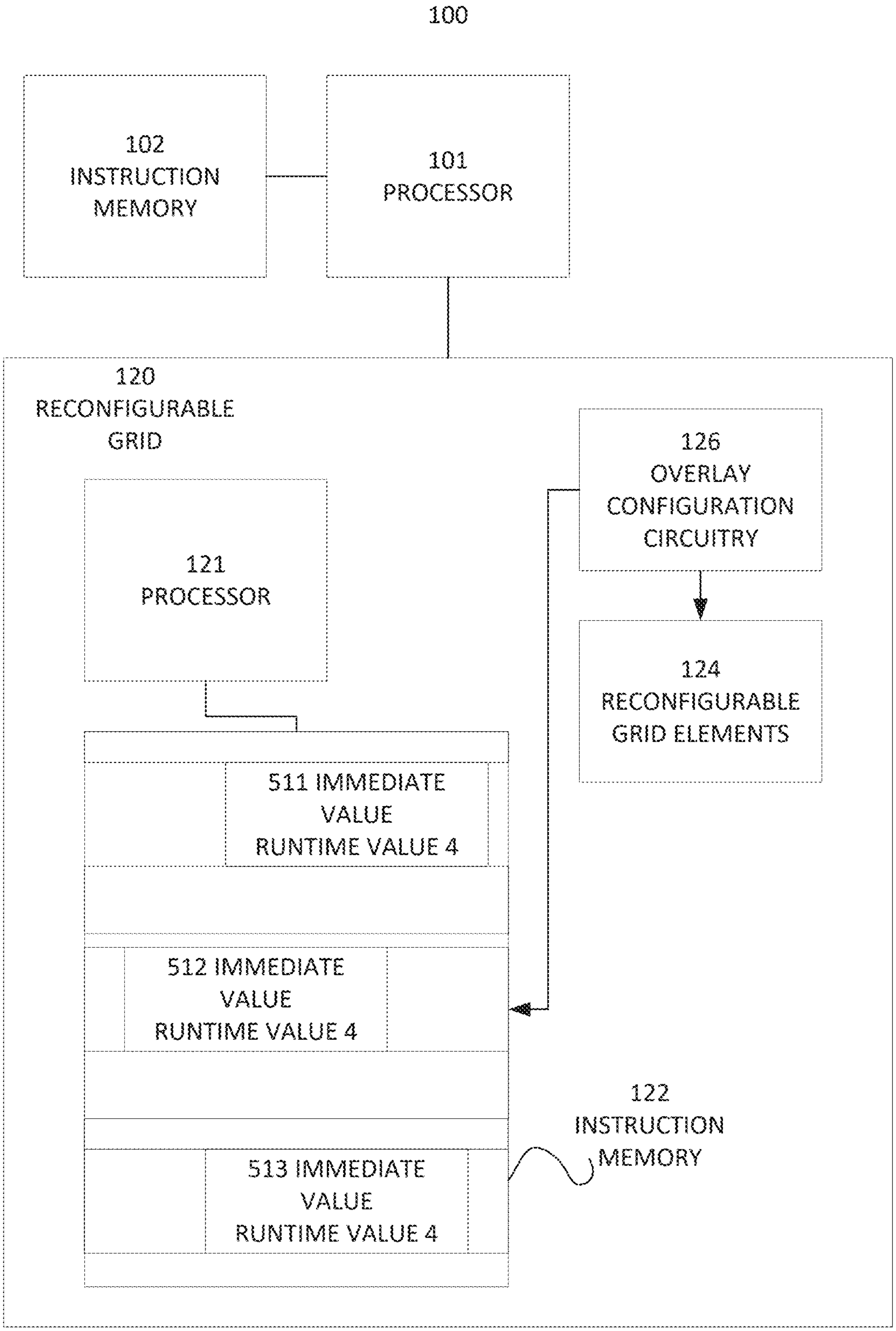
FIG. 5B is a schematic block diagram of the exemplary system after applying an overlay configuration to the instruction memory, according to some embodiments.

Reference is now made also to FIG. 5B, showing a schematic block diagram of the exemplary system 100 after applying an overlay configuration to the instruction memory 122, according to some embodiments. In this example, applying the overlay configuration overwrites the place holder constant value with a runtime value associated with the scope-constant value, for example runtime value 4, such that after applying the overlay configuration each of immediate value 511, immediate value 512 and immediate value 513 stores runtime value 4.

Optionally, after applying the overlay configuration to the instruction memory 122, in embodiments that have an instruction cache the instruction cache may have to be invalidated before resuming execution of the identified scope.

References is now made again to FIG. 2. To apply an overlay configuration, in some embodiments in 225 the processor 100 generates an overlay configuration. Optionally, the processor 101 generates the overlay configuration according to the main configuration, the one or more runtime elements, and an association between each of the one or more scope-constant elements and the respective constant element.

In some embodiments, to generate the overlay configurations the processing circuitry 101 uses an overlay template configuration.

In 207, the processing unit 101 may generate the overlay template configuration, optionally prior to determining the one or more runtime elements in 220. The processing unit 101 may generate the overlay template configuration when computing the main implementation. Optionally, the overlay template configuration updates each of the one or more constant elements with a temporary element. For example, when a scope-constant element is a variable, the overlay template configuration may update a constant element corresponding to the scope-constant element with a temporary value, for example placeholder constant value used in the example described in FIG. 4A. The overlay template configuration may hold instructions for modifying a constant element in the reconfigurable grid 120 using a temporary element and not a runtime element. Thus, the overlay template configuration may comprise, for each of the one or more constant elements, one or more instructions for modifying the constant element in the plurality of reconfigurable grid elements 124 to hold the temporary element. In embodiments where the main implementation comprises a main set of instructions, the overlay template configuration may comprise, for each of the one or more constant elements, one or more instructions for modifying the constant element in the other instruction memory 122 to hold the temporary element.

Additionally or alternatively, the overlay template configuration may comprise for each of the one or more constant elements a location in the reconfigurable processing grid and additionally or alternatively an association with one of the one or more scope-constant element.

After determining the one or more runtime elements, in 225 the processing unit 101 may generate the overlay configuration using the overlay template configuration and the one or more runtime elements. Generating the overlay configuration may comprise replacing in the overlay template configuration the temporary element in the instructions for modifying a constant element with the respective runtime element determined for the constant element. For example, when a scope-constant element is a variable, generating the overlay configuration may comprise replacing in the overlay template configuration the temporary value in the instructions for modifying a constant element corresponding with the scope-constant element with the respective runtime value determined for the constant element.

Referring again to 230, the processing circuitry 101 may provide the overlay template configuration and the one or more runtime elements to the overlay configuration circuitry, in order to apply the overlay configuration to the reconfigurable grid 120. Optionally, the overlay configuration circuitry 126 updates each constant element of the one or more constant elements to hold the respective runtime element detected for the scope-constant element that the constant element corresponds to. The overlay configuration circuitry 126 uses the overlay template configuration and the one or more runtime elements to update the one or more constant elements.

In 240, the reconfigurable grid 120 may execute the identified scope of the software program. For example, the processing grid may execute the modified dataflow grid 300B for the plurality of concurrent threads. The processing grid may execute the identified scope of the software program using the main configuration modified by the overlay configuration.

In some embodiments, the processor 101 may execute at least part of method 200 one or more additional times for executing the identified scope of the software program one or more other times, using other runtime values.

For example, for another plurality of concurrent threads of the software program where each of the other plurality of concurrent threads implements the one or more operations that comprise the common dataflow graph 300A, the processing unit 101 may execute 220 again to determine one or more other runtime elements, one for each of the scope-constant elements. When a scope-constant element is a graph-constant variable, the processing unit 101 may determine one or more other runtime values.

The processing unit 101 may apply another overlay configuration to the main implementation, for example applying another overlay configuration to the reconfigurable grid 120. The other overlay configuration may modify the one or more constant elements without replacing the main configuration, such that each of the one or more constant elements holds the other runtime element, for example runtime value, determined for the scope-constant element corresponding to the constant element.

Figure 6:
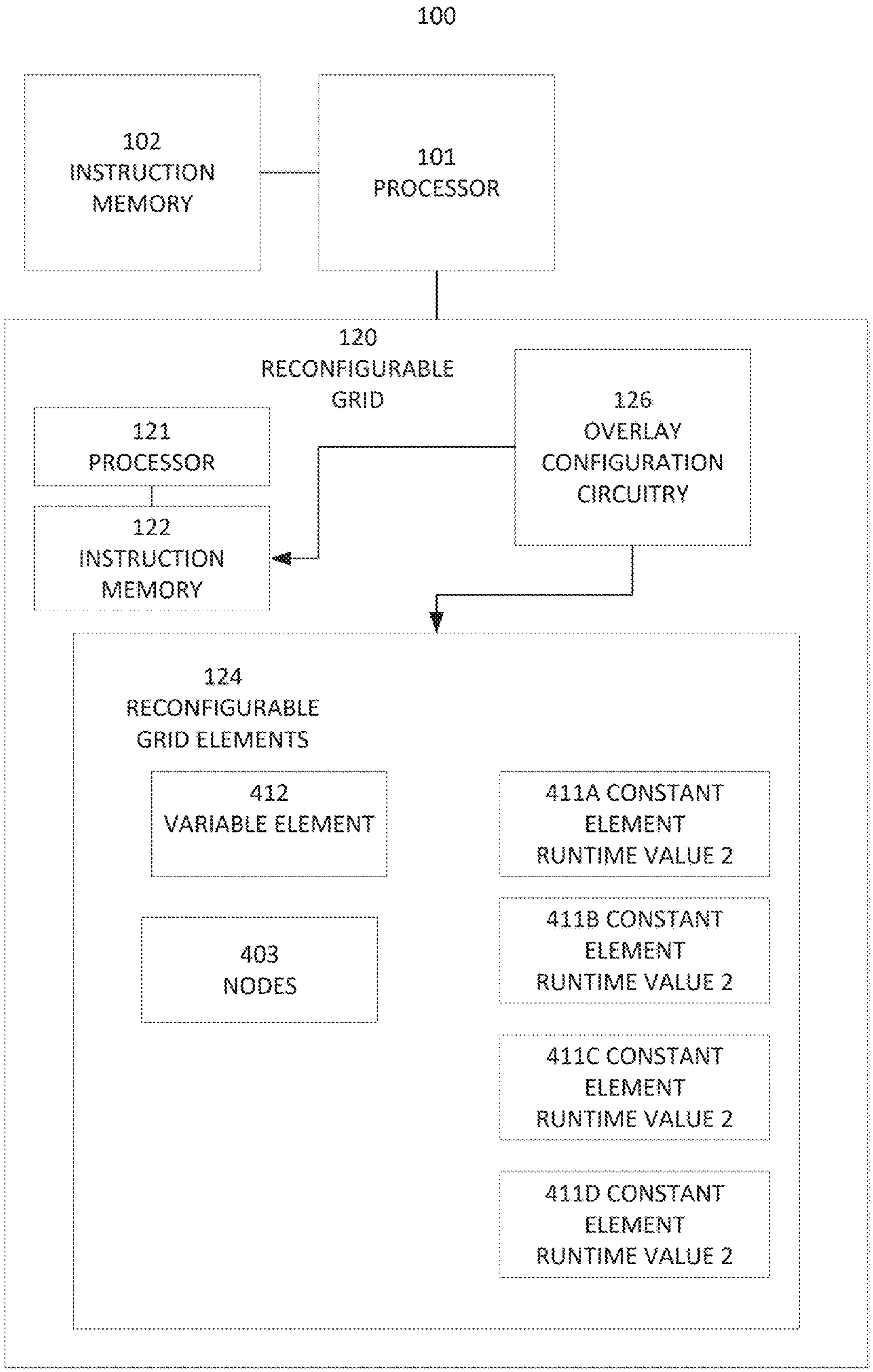
FIG. 6 is a schematic block diagram of the exemplary system after applying another overlay configuration to the reconfigurable grid, according to some embodiments.

Reference is now made also to FIG. 6, showing a schematic block diagram of the exemplary system 100 after applying another overlay configuration to the reconfigurable grid 120, according to some embodiments. In this example, for the other plurality of concurrent threads the processing unit 101 may determine in 220 the value runtime value 2 for the variable element 311 as the respective runtime element corresponding thereto. Thus, after applying the other overlay configuration to reconfigurable grid 120, each of the constant element 411A, constant element 411B, constant element 411C, and constant element 411D may hold the runtime value 2, optionally without changing the configuration of other elements in the processing grid 120.

In some embodiments, the software program comprises more than one identified scope having one or more scope-constant elements. In such embodiments, the processor 101 may execute at least part of method 200 one or more additional times, each for executing an additional identified scope of the software program. For an additional scope of the software program, processing unit 101 may identify in 201 one or more additional scope-constant elements. The one or more additional scope-constant elements may remain constant during execution of the additional identified scope of the software program.

Processing unit 101 may execute 210 again to apply an additional main implementation. The additional main implementation may be an additional main configuration of reconfigurable grid 120, and the processing unit 101 may apply the additional main configuration to the at least another part of the reconfigurable grid 120. The main implementation may be applied to another part of the other instruction memory 122, not holding computer instructions of the identified scope of the software program.

Optionally, the additional main implementation implements one or more additional modified operations of the plurality of operations of the software program. The additional main implementation may comprise one or more additional constant elements. Optionally, for each of the one or more additional scope-constant elements, each reference to the additional scope-constant element in the one or more additional operations is replaced in the one or more additional modified operations by a placeholder constant element implemented by an additional constant element, where the additional constant element corresponds to the additional scope-constant element.

Processing unit 101 may execute 220 again to determine one or more additional runtime elements, one for each of the one or more additional scope constant elements, for example including runtime value 3.

Processing unit 101 may execute 230 again to apply an additional overlay configuration. For example, when the additional main implementation is an additional main configuration of reconfigurable grid 120, the processing unit 101 may apply the additional overlay configuration to the at least another part of the reconfigurable grid 120. When the main implementation is applied to another part of the other instruction memory 122, the processing unit 101 may apply the additional overlay configuration to the other part of the other instruction memory 122.

Figure 7:
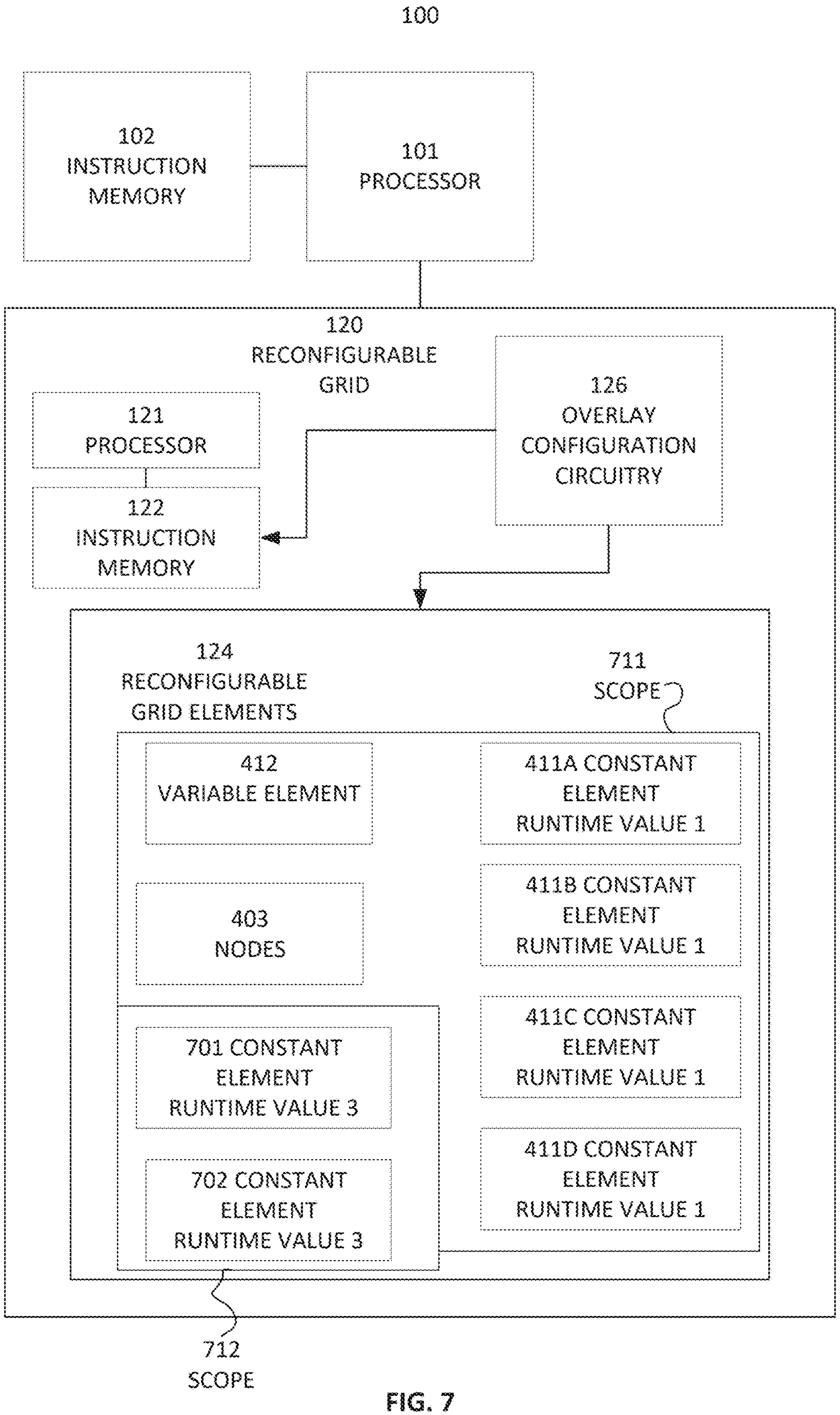
FIG. 7 is a schematic block diagram of the exemplary system after applying an additional main configuration and an additional overlay configuration to the reconfigurable grid, according to some embodiments.

Reference is now made also to FIG. 7, showing a schematic block diagram of the exemplary system 100 after applying an additional main configuration and an additional overlay configuration to the reconfigurable grid 120, according to some embodiments. In this example the constant element 411A, the constant element 4111B, the constant element 411C, the constant element 411D, the variable element 412 and the plurality of nodes 403 are at least part of the identified scope of the software program, identified here as scope 712.

Additional scope 712 may comprise additional constant element 701 and additional constant element 702. Applying the additional overlay configuration to the reconfigurable grid 120 may update each of additional constant element 701 and additional constant element 702 to hold runtime value 3, optionally without changing the configuration of any of the elements of scope 701.

In some embodiments, additionally or alternatively to using an overlay configuration, the present disclosure proposed using static feeding mechanisms to load values that remain constant throughout execution of the identified scope of the code sequence.

Figure 8:
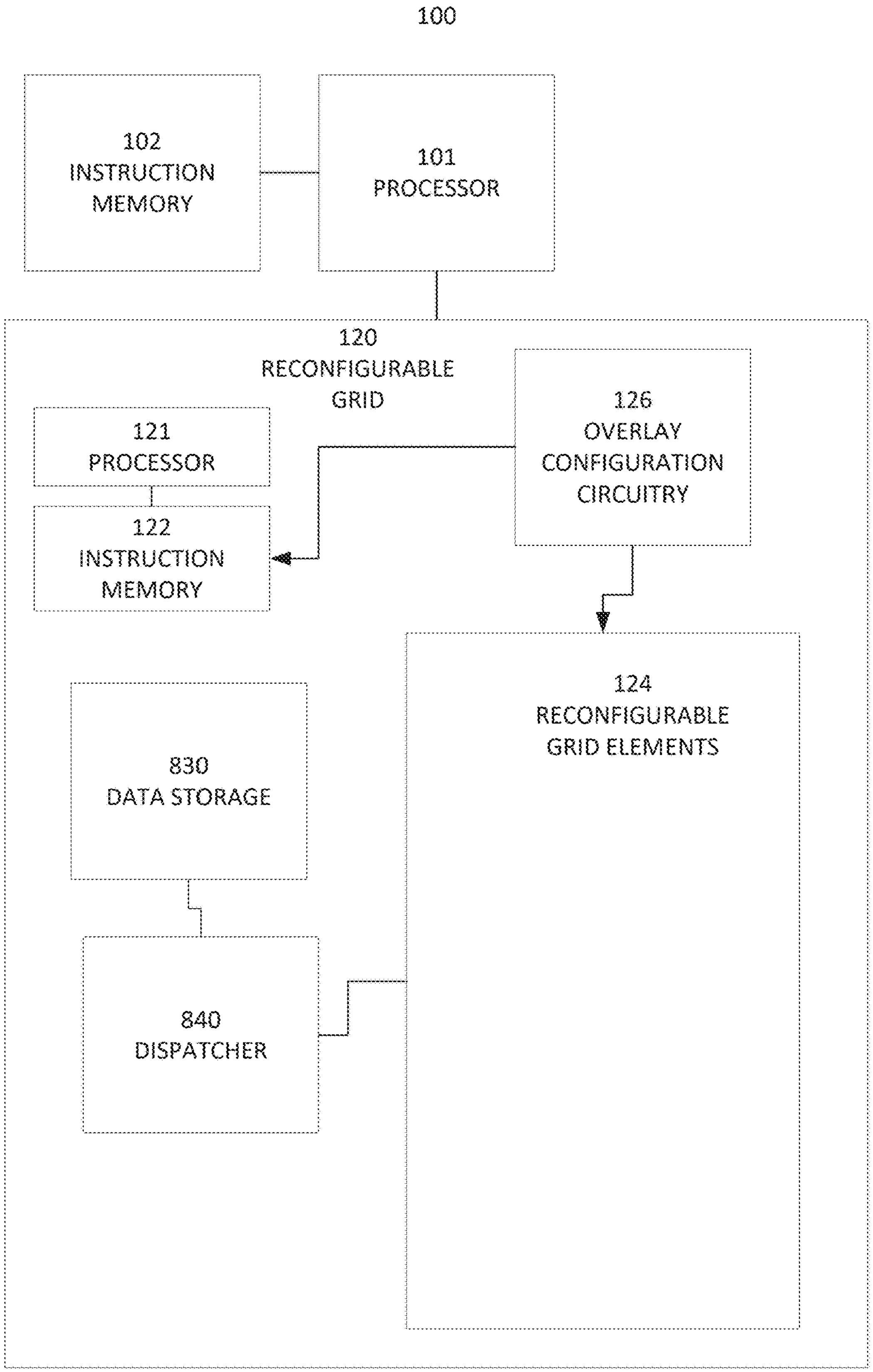
FIG. 8 is a schematic block diagram of the exemplary system as used for static feeding, according to some embodiment.

Reference is now made also to FIG. 8, showing a schematic block diagram of the exemplary system 100 as used for static feeding, according to some embodiment. In such embodiments, the reconfigurable grid 120 further comprises data storage 830. Data storage 830 may comprise one or more context storages for storing, for each of a set of concurrent threads executed by the reconfigurable grid, a thread context comprising a plurality of runtime values of the thread. A context memory may be an array comprising a plurality of context entries, each storing at least part of a thread context on one or more of the set of concurrent threads. The data storage may be distributed over a plurality of storage elements.

Optionally, the reconfigurable grid comprises a dispatcher circuitry, configured to dispatch the set of concurrent threads for execution. The dispatcher circuitry may load one or more values from the data storage 830 to one or more elements implemented in the plurality of reconfigurable elements 124, for example when dispatching a thread for execution. The reconfigurable grid may comprise more than one dispatcher circuitry.

To implement grid-autonomous loading, i.e. static feeding, system 100 may implement the following optional method.

Figure 9:
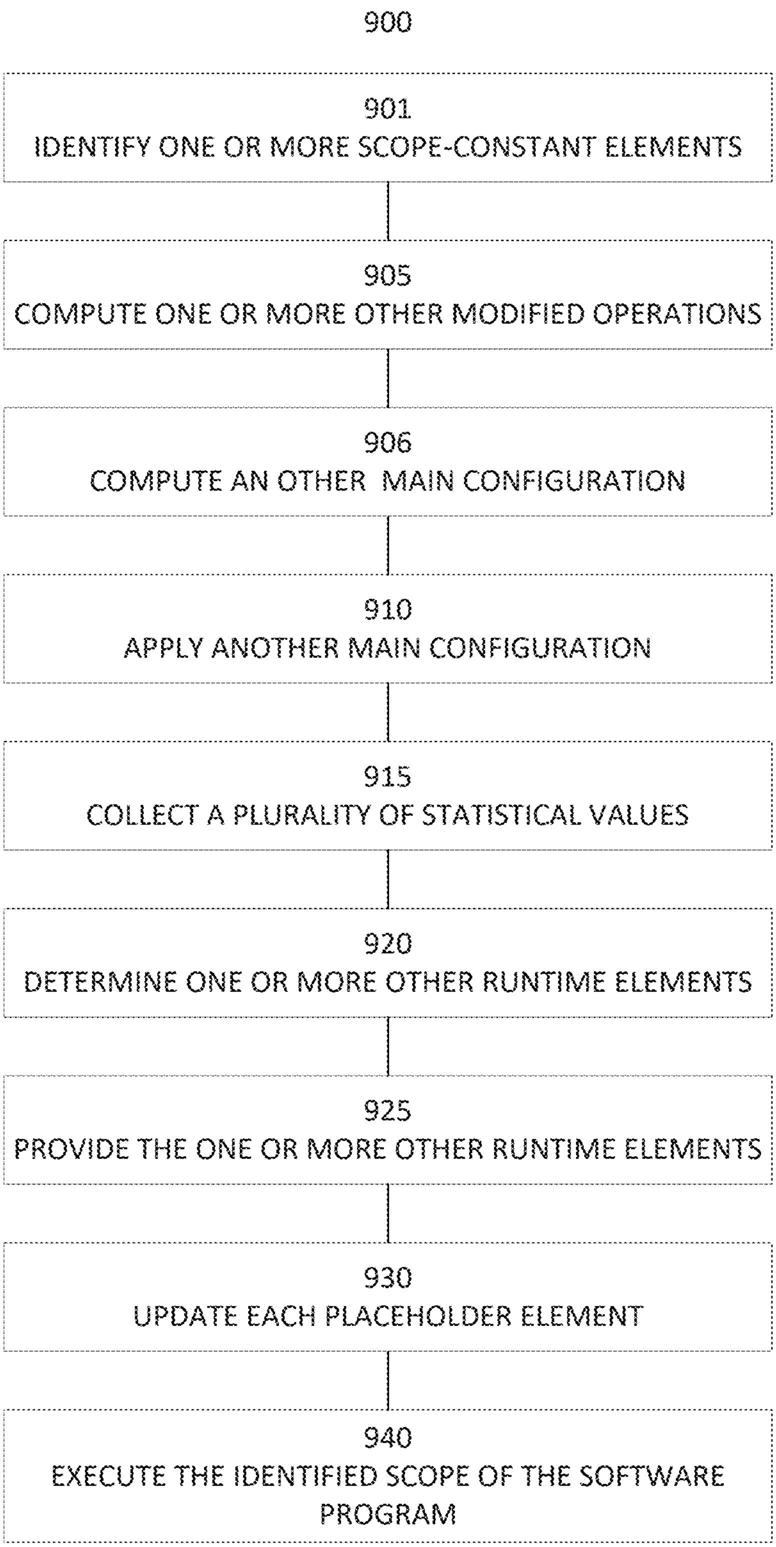
FIG. 9 is a flowchart schematically representing another optional flow of operations, according to some embodiments.

Reference is now made also to FIG. 9, showing a flowchart schematically representing another optional flow of operations 900, according to some embodiments. In such embodiments, in 901 processing unit 101 may identify one or more scope-constant elements in the plurality of operations of the software program, similar to step 201 of method 200.

In 905, processing unit 101 optionally computes one or more other modified operations. For each of the one or more scope-constant elements, in the one or more other modified operations each reference to the scope-constant element is replaced by a placeholder element that corresponds to the scope-constant element. The placeholder element may be a variable element, that can be updated, in the reconfigurable grid, by the reconfigurable grid.

For example, when each of the plurality of concurrent threads implements the common dataflow graph, the one or more other modified operations may comprise another modified dataflow graph. For each of the one or more graph-constant variables of the common dataflow graph, in the other modified dataflow graph each reference to the graph-constant variable is replaced by a placeholder variable.

Figure 10:
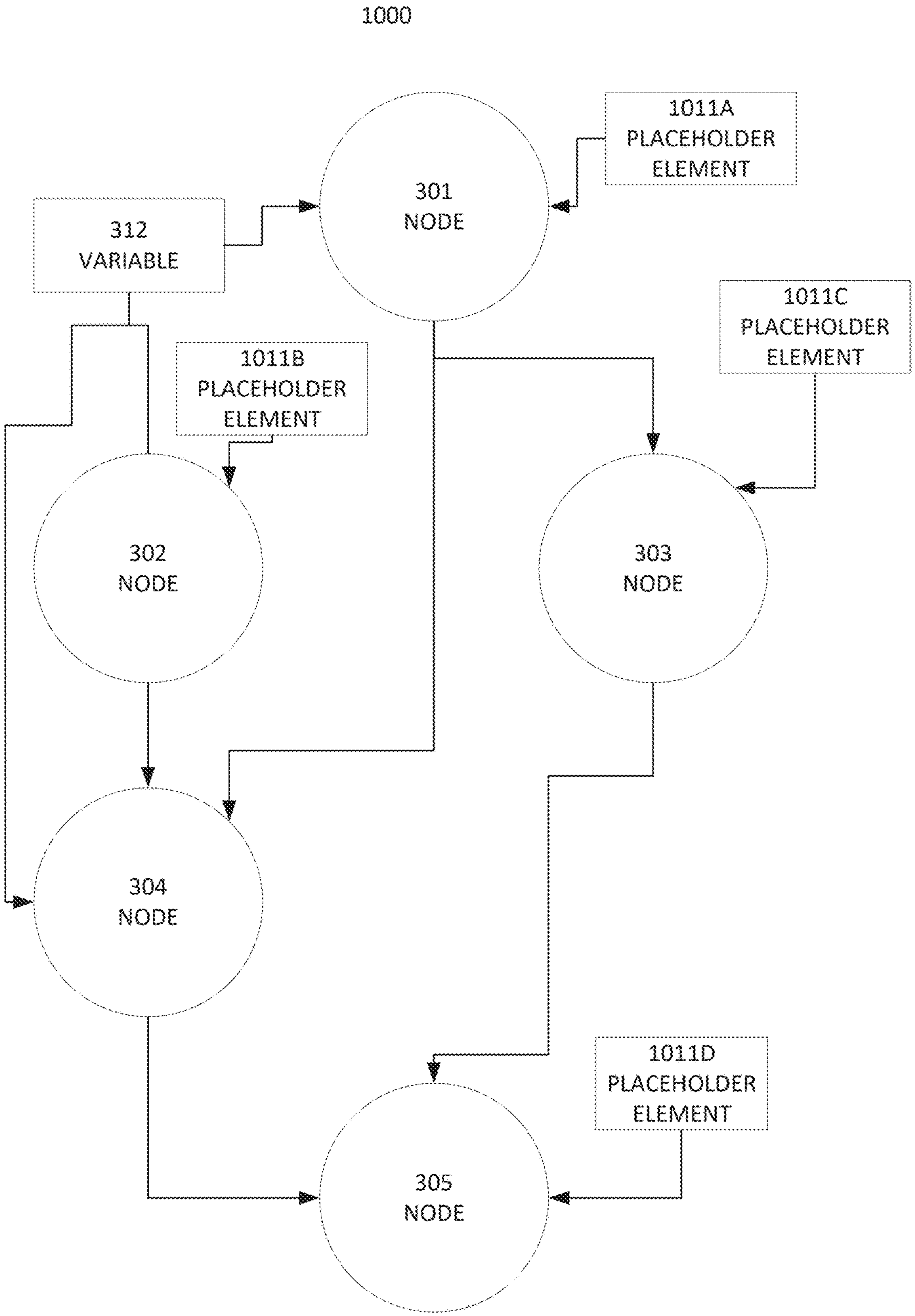
FIG. 10 is a schematic block diagram of another exemplary modified dataflow graph with placeholder elements, according to some embodiments.

Reference is now made also to FIG. 10, showing a schematic block diagram of another exemplary modified dataflow graph 1000 with placeholder elements, according to some embodiments. In this example, the reference of variable 311 in node 301 via path 321A of FIG. 3A is replaced with a placeholder variable 1011A connected to node 301, as the respective placeholder element. Similarly, in this example the reference of variable 311 in node 302 via path 321B is replaced with a placeholder variable 1011B connected to node 302, the reference of variable 311 in node 303 via path 321C is replaced with a placeholder variable 1011C connected to node 303, and the reference of variable 311 in node 305 via path 321D is replaced with a placeholder variable 1011D connected to node 305. Optionally, variable 311 is removed from the modified dataflow graph 1000. Further in this example, variable 312 may not remain constant throughout execution of the common dataflow graph, and additionally or alternatively may not have a common value across all of the plurality of concurrent threads, and is not a graph-constant variable. In this example, variable 312 and its connections to 301, node 302 and node 304 remain unchanged compared to dataflow graph 300A.

Reference is now made again to FIG. 9. Optionally, computing the one or more other modified operations comprises replacing the common dataflow graph 300A in the one or more operations with the other modified dataflow graph 1000.

In 906, processing unit 101 may compute another main implementation, similar to computing the main implementation in 206 of method 200. The other main implementation may implement the one or more other modified operations. Optionally, processing unit 101 computes the other main implementation using the one or more other modified operations.

In 910, the processing unit 101 may apply the other main implementation, similar to step 210 in method 200. Optionally, the main implementation comprises another main configuration of the reconfigurable grid 120. Optionally, the processing unit 101 applies the other main configuration to the reconfigurable grid 120.

Figure 11:
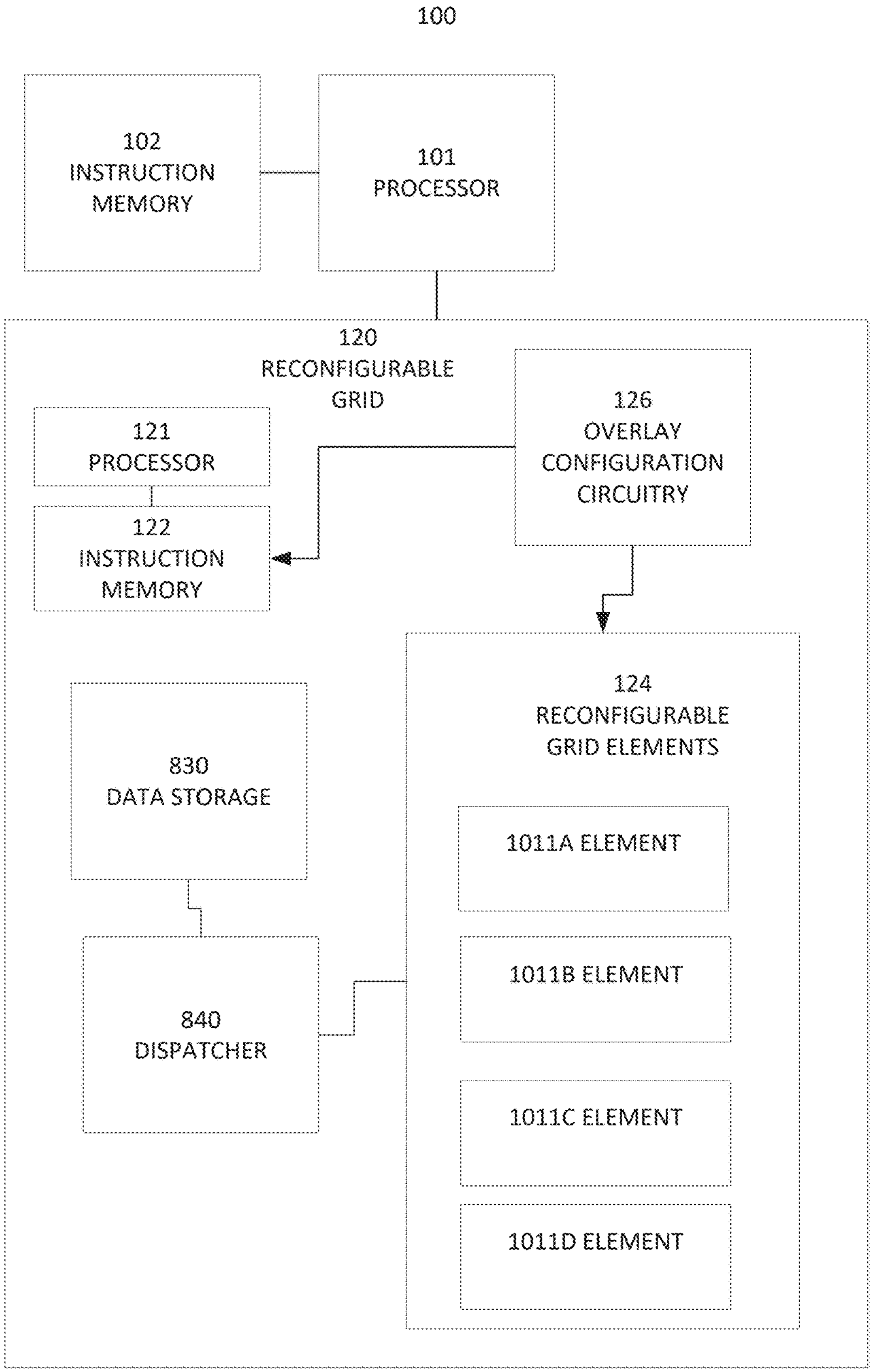
FIG. 11 is a schematic block diagram of the exemplary system after applying another main configuration to the reconfigurable grid, according to some embodiments.

Reference is now made also to FIG. 11, showing a schematic block diagram of the exemplary system 100 after applying another main configuration to the reconfigurable grid 120, according to some embodiments. In this example, the other main configuration implements one or more other modified operations comprising other modified dataflow graph 1000, such that a scope of executing the other modified dataflow graph 1000 is the identified scope of execution of the software program.

In this example, processing unit 101 computes another main configuration comprising implementing the other modified dataflow graph 1000 in the plurality of reconfigurable grid elements 124. In this example, the other main configuration configures the plurality of reconfigurable grid elements 124 to implement the other modified dataflow graph 1000 including one or more placeholder elements comprising the placeholder element 1011A, placeholder element 10111B, placeholder element 1011C, and placeholder element 1011D. Optionally, the other main configuration implements an association between at least one of the one or more placeholder elements and one or more elements stored in the data storage 830.

Reference is now made again to FIG. 9. In 920, the processing unit 101 may determine one or more other runtime elements. The one or more other runtime elements may comprise another runtime element for each of the one or more scope constant elements. For example, in 920 processing unit 101 may determine a runtime value 5 for scope-constant element 312.

Optionally, in 915 the processing unit 101 collects a plurality of statistical values while executing the software program, similar to step 215 in method 200. The processing unit 101 may determine the one or more other runtime elements in 920 according to the plurality of statistical values collected in 915.

In 925, the processing unit 101 may provide the one or more other runtime elements to the reconfigurable grid 120, for example by storing the one or more other runtime elements in the data storage 830, for example when a runtime element is a runtime value. The processing unit 101 may provide the one or more other runtime elements prior to execution of the identified scope of the software program.

In 930, the reconfigurable grid 120 may update each placeholder element of the one or more placeholder elements, for example by dispatcher 840. Optionally, the reconfigurable grid 120 updates a placeholder element to hold the respective other runtime element determined for the scope-constant element that the placeholder element corresponds to.

An element that is another runtime element may be provided by the processing unit 101, optionally stored in data storage 340. When the data storage 830 comprises a context storage, an element that is another runtime element may be another runtime value computed while execution the software program before execution of the identified scope, and stored as part of at least one thread context of at least one of the plurality of concurrent threads. When the other main configuration implements an association between a placeholder elements an element stored in the data storage 830, the association may indicate that that the element stored in the data storage corresponds to the scope-constant element that the placeholder element replaces.

Figure 12:
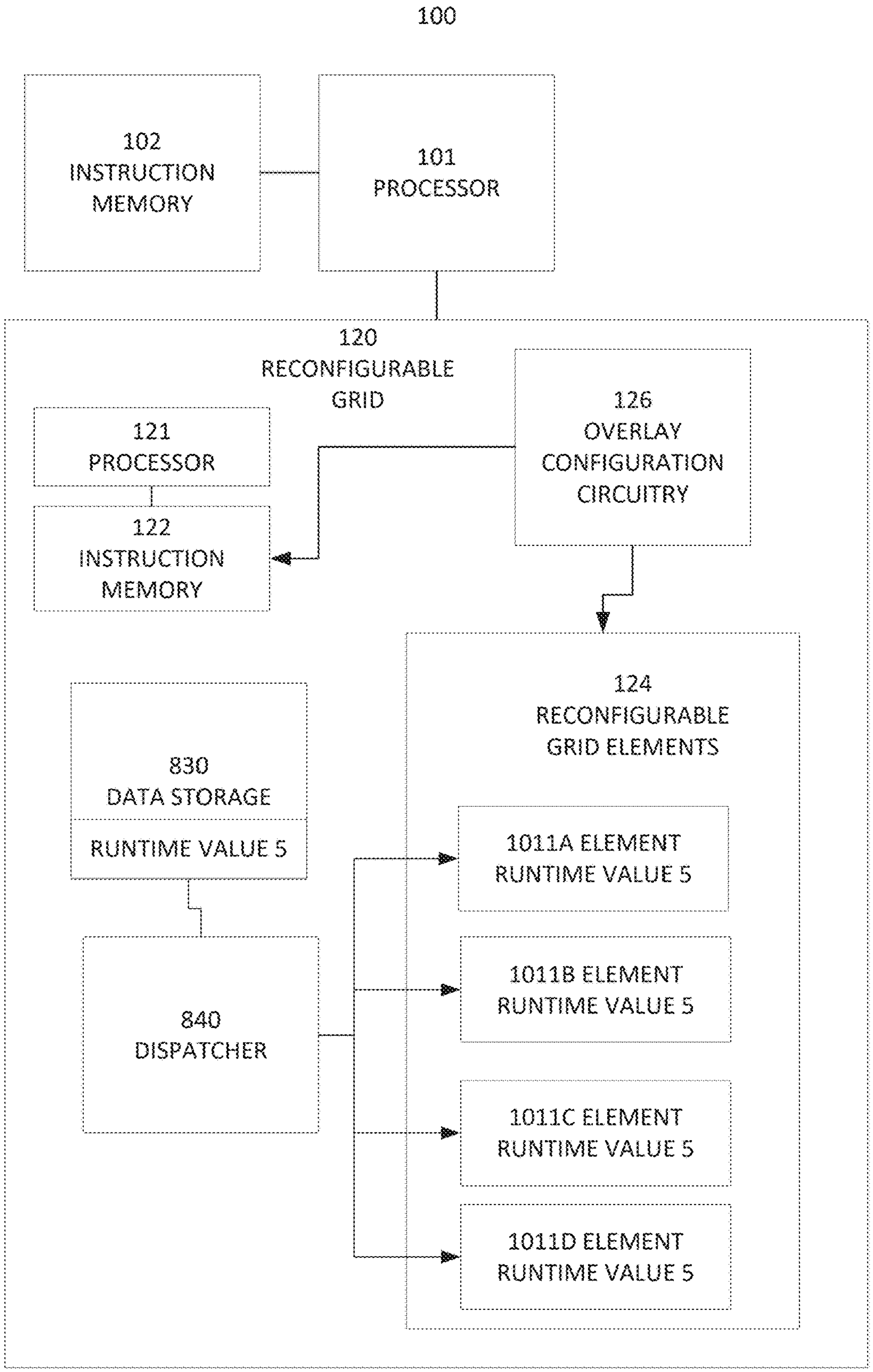
FIG. 12 is a schematic block diagram of the exemplary system after static feeding, according to some embodiments.

Reference is now made also to FIG. 12, showing a schematic block diagram of the exemplary system 100 after static feeding, according to some embodiments. When processing unit 101 determines in 920 runtime value 5 as the runtime element corresponding to variable 311, processing unit 101 may store runtime value 5 in the data storage 830. The other main configuration may implement an association between runtime value 5 in the data storage 830 and the one or more placeholder elements in the plurality of reconfigurable runtime elements 124.

Optionally, executing the software program computes runtime value 5 as a context value associated with the one or more placeholder elements.

Updating the one or more placeholder elements modifies each of the one or more placeholder elements to hold the runtime value 5, such that each of placeholder element 1011A, placeholder element 1011B, placeholder element 1011C, and placeholder element 1011D hold runtime value 5. Optionally, dispatcher 840 retrieves the runtime value 5 from the data storage 830. Optionally, dispatcher 840 updates the one or more placeholder elements to each hold the runtime value 5, optionally according to an association in the main configuration between a location in data storage 830 and the one or more placeholder elements.

Reference is now made again to FIG. 9.

The reconfigurable grid 120 may identify that the software program is ready to execute the identified scope thereof, for example that the plurality of concurrent threads are ready to execute the other modified dataflow graph. The reconfigurable grid 120 may update the one or more placeholder elements after identifying that the software program is ready to execute the identified scope, optionally in response to identifying that the software program is ready to execute the identified scope In 940, the reconfigurable grid 120 may execute the identified scope of the software program. For example, the processing grid may execute the modified dataflow grid 1000 for the plurality of concurrent threads. The processing grid may execute the identified scope of the software program using the main configuration updated with the one or more other runtime values.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant configurations will be developed and the scope of the term configuration is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for executing a software program, comprising:

a reconfigurable processing grid; and at least one hardware processor configured to:

for a software program comprising a plurality of operations, identify in the plurality of operations at least one scope-constant element, where a scope-constant element is an element of the software program that remains constant during execution within an identified scope of the software program;

apply a main configuration to at least part of the reconfigurable processing grid, wherein the main configuration implements at least one modified operation of the plurality of operations, wherein in the at least one modified operation, for each of the at least one scope-constant element, each reference to said scope-constant element is replaced by a placeholder constant element implemented by a constant element of at least one constant element of the main configuration, each constant element of the at least one constant element corresponding to one of the at least one scope-constant element and not updatable by execution of the identified scope of the software program;

determine at least one runtime element, one for each of the at least one scope-constant element; and prior to execution of the identified scope of the software program by the reconfigurable processing grid, apply to the reconfigurable processing grid an overlay configuration that modifies the at least one constant element without replacing the main configuration, wherein the overlay configuration updates each constant element of the at least one constant element to hold the respective runtime element determined for the scope-constant element that the constant element corresponds to, such that the main configuration is modified by the overlay configuration.

2. The system of claim 1, wherein the reconfigurable processing grid is configured to execute the identified scope of the software program using the main configuration modified by the overlay configuration.

3. The system of claim 1, wherein the reconfigurable processing grid comprises an overlay configuration circuitry;

wherein the at least one hardware processor is configured to apply the overlay configuration to the reconfigurable processing grid by providing the overlay configuration circuitry with the overlay configuration; and wherein the overlay configuration circuitry is configured to update each constant element of the at least one constant element according to the overlay configuration.

4. The system of claim 1, wherein the at least one hardware processor is further configured to:

prior to determining the at least one runtime element, compute an overlay template configuration for modifying the at least one constant element without replacing the main configuration, wherein the overlay template configuration updates each of the at least one constant element with a temporary element; and after determining the at least one runtime element generate the overlay configuration using the overlay template configuration and the at least one runtime element.

5. The system of claim 4, wherein the overlay template configuration comprises for each of the at least one constant elements at least one instruction for modifying the constant element in the reconfigurable processing grid to hold the temporary element.

6. The system of claim 4, wherein the overlay template configuration comprises for each of the at least one constant element one or more of: a location in the reconfigurable processing grid, and an association with a scope-constant element of the at least one scope-constant elements.

7. The system of claim 4, wherein the reconfigurable processing grid comprises an overlay configuration circuitry;

wherein the at least one hardware processor is configured to apply the overlay configuration to the reconfigurable processing grid by providing the overlay configuration circuitry with the overlay template configuration and the at least one runtime element; and wherein the overlay configuration circuitry is configured to update each constant element of the at least one constant element to hold the respective runtime element determined for the scope-constant element that the constant element corresponds to, using the overlay configuration template and the at least one runtime element.

8. The system of claim 1, wherein the at least one scope-constant element is identified using at least one static analysis method applied to at least part of the software program.

9. The system of claim 1, wherein the at least one hardware processor is further configured to determine the at least one runtime element according to a plurality of statistical values collected while executing the software program.

10. The system of claim 1, wherein the reconfigurable processing grid comprises a plurality of reconfigurable logical elements connected by a plurality of reconfigurable data routing junctions; and wherein applying the main configuration to the at least part of the reconfigurable processing grid comprises manipulating at least some of the plurality of reconfigurable logical elements and additionally or alternatively manipulating at least some of the plurality of reconfigurable data routing junctions.

11. The system of claim 1, wherein the scope-constant element is a data variable that is part of program data of the software program; and wherein the data variable is identified in the software program by a variable identifier.

12. The system of claim 1, wherein the scope-constant element is an operation code of a computer instruction of a plurality of computer instructions of the software program.

13. The system of claim 1, wherein the overlay configuration updates each of one or more constant elements of the at least one constant element with another constant element and selection circuitry for selecting between one or more runtime values.

14. The system of claim 1, wherein the plurality of operations implement a plurality of concurrent threads of the software program;

wherein each of the concurrent threads implements at least one operation, wherein the at least one operation comprises a common dataflow graph;

wherein the at least one scope-constant element is at least one graph-constant variable, wherein a graph-constant variable is a data variable of the common dataflow graph that remains constant throughout execution of the dataflow graph and when executing the plurality of concurrent threads will have a common value across all of the plurality of concurrent threads;

wherein the at least one modified operation comprises a modified dataflow graph in which, for each of the at least one graph-constant variable, each reference to said graph-constant variable is replaced by a placeholder constant value as the respective placeholder constant element, wherein the placeholder constant value is not updatable via execution of the modified dataflow graph; and wherein the at least one runtime element is at least one runtime value, one for each of the at least one graph-constant variable.

15. The system of claim 14, wherein the at least one hardware processor is further configured to:

compute the modified dataflow graph;

compute the at least one modified operation, comprising replacing the common dataflow graph in the at least one operation with the modified dataflow graph; and compute the main configuration using the at least one modified operation.

16. The system of claim 14, wherein the at least one hardware processor is further configured to:

for another plurality of concurrent threads of the software program, each implementing the at least one operation that comprises the common dataflow graph, determine at least one other runtime value, one for each of the at least one graph-constant variable; and prior to execution of the other plurality of concurrent threads by the reconfigurable processing grid, apply to the reconfigurable processing grid another overlay configuration that modifies the at least one constant element without replacing the main configuration, wherein the other overlay configuration updates each constant element of the at least one constant element to hold the respective other runtime value determined for the graph-constant variable that the constant element corresponds to, such that the main configuration is further modified by the other overlay configuration.

17. The system of claim 14, wherein the at least one hardware processor applies the overlay configuration in response to identifying that the plurality of concurrent threads are ready to execute the modified dataflow graph.

18. The system of claim 1, wherein the at least one hardware processor is further configured to:

for an additional scope of the software program, identify at least one additional scope-constant element that remains constant during execution within the additional identified scope of the software program;

apply an additional main configuration to at least another part of the reconfigurable processing grid, wherein the additional main configuration implements at least one additional modified operation of the plurality of operations, wherein in the at least one additional modified operation, for each of the at least one additional scope-constant element, each reference to said additional scope-constant element is replaced by a placeholder constant element implemented by an additional constant element of at least one additional constant element of the additional main configuration, each additional constant element corresponding to one of the at least one additional scope-constant element and not updatable via execution of the additional identified scope of the software program;

determine at least one additional runtime element, one for each of the at least one additional scope-constant element; and prior to execution of the additional identified scope of the software program by the reconfigurable processing grid, apply to the reconfigurable processing grid an additional overlay configuration that modifies the at least one additional constant element without replacing the additional main configuration, wherein the additional overlay configuration updates each additional constant element of the at least one additional constant element to hold the respective additional runtime element determined for the additional scope-constant element that the additional constant element corresponds to, such that the additional main configuration is modified by the additional overlay configuration.

19. A method for executing a software program, comprising:

for a software program comprising a plurality of operations, identifying in the plurality of operations at least one scope-constant element, where a scope-constant element is an element of the software program that remains constant during execution within an identified scope of the software program;

applying a main configuration to at least part of a reconfigurable processing grid, wherein the main configuration implements at least one modified operation of the plurality of operations, wherein in the at least one modified operation, for each of the at least one scope-constant element, each reference to said scope-constant element is replaced by a placeholder constant element implemented by a constant element of at least one constant element of the main configuration, each constant element of the at least one constant element corresponding to one of the at least one scope-constant element and not updatable by execution of the identified scope of the software program;

determining at least one runtime element, one for each of the at least one scope-constant element; and prior to execution of the identified scope of the software program by the reconfigurable processing grid, applying to the reconfigurable processing grid an overlay configuration that modifies the at least one constant element without replacing the main configuration, wherein the overlay configuration updates each constant element of the at least one constant element to hold the respective runtime element determined for the scope-constant element that the constant element corresponds to, such that the main configuration is modified by the overlay configuration.

20. The method of claim 19, wherein the plurality of operations implement a plurality of concurrent threads of the software program; and wherein the method further comprises executing the plurality of concurrent threads by the reconfigurable processing grid, using the main configuration modified by the overlay configuration.

21. A system for executing a software program, comprising:

a reconfigurable processing grid; and at least one hardware processor configured to:

for at least one thread of the software program, each implementing at least one operation comprising a dataflow graph, identify at least one graph-constant variable, wherein a graph-constant variable is a data variable of the dataflow graph that remains constant throughout execution of the dataflow graph;

apply a main configuration to at least part of the reconfigurable processing grid, wherein the main configuration implements at least one modified operation comprising a modified dataflow graph in which, for each of the at least one graph-constant variable, each reference to said graph-constant variable is replaced by a placeholder element of at least one placeholder elements, the placeholder element corresponding to said graph-constant variable;

determine at least one runtime value, one for each of the at least one graph-constant variable; and provide the at least one runtime value to the reconfigurable processing grid; and wherein the reconfigurable processing grid is configured to:

prior to execution of the at least one thread, update each placeholder element of the at least one placeholder elements to hold the respective runtime value determined for the graph-constant variable that the placeholder element corresponds to.

* * * * *